US012377677B2

(12) United States Patent
Moll et al.

(10) Patent No.: US 12,377,677 B2
(45) Date of Patent: Aug. 5, 2025

(54) OUTPUT DEVICE FOR UNIFORMLY MIXED LIQUID AND METHOD FOR MAKING AND USING THE SAME

(71) Applicants: Crayola LLC, Easton, PA (US); Beijing Wenhaiyang Industry Trading Co., Ltd, Beijing (CN)

(72) Inventors: Joseph Moll, Bethlehem, PA (US); Gregory Nungester, Milford, NJ (US); Keith Alison, Blandon, PA (US); Michael Moskal, Pottstown, PA (US); Christopher P. Orem, Easton, PA (US); Ying K Ho, Bethlehem, PA (US); Luo Xiaomeng, Kowloon (HK); Ivan Li, Kowloon (HK); Hui Max Sze Mo, Taipo (HK); Ho Yiu Keung, Kowloon (HK); Jin Chaoyang, Beijing (CN); Guo Haiteng, Beijing (CN); Bai Wen, Beijing (CN); Robert J. Henry, Bethlehem, PA (US)

(73) Assignees: Crayola LLC, Easton, PA (US); ;Beijing Wenhaiyang Industry Trading Co., Ltd., Beijing (CN)

( * ) Notice: Subject to any disclaimer, the term of this patent is extended or adjusted under 35 U.S.C. 154(b) by 0 days.

(21) Appl. No.: 18/137,011

(22) Filed: Apr. 20, 2023

(65) Prior Publication Data

US 2023/0391130 A1 Dec. 7, 2023

(30) Foreign Application Priority Data

Apr. 20, 2022 (CN) ........................ 202210416218.X
Apr. 20, 2022 (CN) ......................... 202220920729.0

(51) Int. Cl.
*B43K 5/18* (2006.01)
*B43K 5/02* (2006.01)

(52) U.S. Cl.
CPC . *B43K 5/18* (2013.01); *B43K 5/02* (2013.01)

(58) Field of Classification Search
CPC ... B43K 5/18; B43K 5/02; B43K 3/02; B43K 5/105; B43K 5/1809; B43K 7/02; B43K 7/08; B43K 8/03; B43K 8/04; B43K 8/18
(Continued)

(56) References Cited

U.S. PATENT DOCUMENTS 4,753,546 A 6/1988 Witz et al.
4,928,121 A 5/1990 Raahauge
(Continued)

FOREIGN PATENT DOCUMENTS

GB 2142584 A 1/1985
JP S59192382 U 6/1983

*Primary Examiner* — David J Walczak
(74) *Attorney, Agent, or Firm* — Stinson LLP

(57) ABSTRACT

A vented output device for uniformly mixed liquid comprising a barrel defining a reservoir for containing the uniformly mixed liquid, and at least one vent channel extending from a first vent opening in fluid flow communication with an exterior of the device and second vent opening in fluid flow communication with the reservoir. A binary ink storage assembly includes multiple glass ampoules arranged in pairs, which are placed inside the barrel in parallel. The invention provides a reliable, simple and low-cost output device for solving the problem of not allowing the liquid to be uniformly mixed and output when a chemiluminescent marker or pen is activated.

23 Claims, 17 Drawing Sheets

(58) Field of Classification Search
USPC .... 401/196, 198, 199, 224, 227–229, 40–47
See application file for complete search history.

(56) References Cited

U.S. PATENT DOCUMENTS

| | | | | |
|---|---|---|---|---|
| 5,906,446 | A * | 5/1999 | McCulloch .............. | B43K 8/08<br>401/199 |
| 7,824,122 | B2 * | 11/2010 | Flores ..................... | A61P 31/02<br>401/133 |
| 2003/0180084 | A1 | 9/2003 | Firukawa et al. | |
| 2010/0047005 | A1 | 2/2010 | Harada et al. | |
| 2015/0376423 | A1 * | 12/2015 | Kadowaki .............. | C09D 11/00<br>401/209 |

* cited by examiner

OUTPUT DEVICE FOR UNIFORMLY MIXED LIQUID AND METHOD FOR MAKING AND USING THE SAME

CROSS-REFERENCE TO RELATED APPLICATIONS

This application is based on and claims priority to Chinese Patent Invention application 202210416218.X filed on Apr. 20, 2022 and Chinese Utility Model application 202220920729.0 filed on Apr. 20, 2022, both of which are incorporated herein by reference in its entirety.

STATEMENT REGARDING FEDERALLY SPONSORED RESEARCH OR DEVELOPMENT

Not applicable.

STATEMENT REGARDING JOINT RESEARCH AGREEMENT

Not applicable.

BACKGROUND OF THE INVENTION

1. Field of the Invention

The invention herein involves the technical field of the mixing of a multi-component liquid, specifically related to an output device for uniformly mixed liquid. In one embodiment, the output device is a marker or pen for writing, drawing and/or coloring with a liquid such as ink and is particularly well adapted for use with luminescent "glow" ink compositions.

2. Description of Related Art

Currently, in some multi-liquid mixing devices, the mixed liquid needs to be output through porous adsorbent materials, such as chemiluminescent liquid featuring binary liquid reaction as the output destination device.

The invention patent with patent application number CN96219763.7 (referred to as scheme 1) discloses a luminous writing pen, which attempts to provide a pen that can output reactive liquid. The output end of the pen is an area controlled by a valve or ball to mix the liquid to react and output. This design has obvious defects. On the one hand, the chemiluminescent liquid is highly sensitive to impurities, and the expensive valve or ball release structure will cause cross-contamination of the two reaction solutions when it closes and opens, resulting in premature failure of the liquid. On the other hand, the barrel does not include an air intake and exhaust structure such that the external atmosphere cannot enter the pen, preventing the ink from discharging functionally. Even if an air intake and exhaust design is added onto the disclosed structure, the sensitivity of the luminescent liquid to the environment will render the product ineffective during the storage process.

The invention patent with the patent application number CN20082,0109821.9 (referred to as scheme 2) discloses a luminescent liquid output device. It outputs the premixed liquid to the tip of the adsorbent material by pressurization in the pen. This scheme uses a separation structure which is complicated to operate and expensive, and meanwhile, it is not easy to control the pressurization, causing overflow.

The invention patent with the patent application number 201810510419.X (referred to as scheme 3) discloses a liquid storage and discharge device and pen. It provides a pen with a kind of separation structure. Specifically, two substances are released at the same time in a movable cavity and a premix cavity composed of a sphere, an orifice plate and a pen cavity are provided. The liquid is mixed as much as possible and then released into the porous adsorbent material at the front end to output the reaction liquid. Herein, schemes 2 and 3 both propose a premixing step, because in practice, the general structure of the pen usually includes adsorbent materials like foaming nibs or cotton wicks. If the binary reaction solution is not premixed, then there is a certain probability that one of the liquids first comes into contact with the adsorbent material. In reality, the single-component liquid will stop mixing once it contacts the adsorbent material, and then even the fully mixed liquid can only push the unreacted single-component liquid at the front, in order to continue pushing the output forward. And due to the chromatographic phenomenon of the adsorbent material, the single-component liquid will not be fully mixed with the subsequent liquid in this process, so that the liquid will not have a chemiluminescence reaction even if it is output to the top of the nib. This means that there is a certain probability that a user would use a "defective" pen that does not luminesce from the very beginning. In scheme 3, however, a premixing cavity composed of a sphere, an orifice plate and a pen cavity, is a complex scheme involving high costs and an uncertain effect.

The invention patent with patent application number CN201822227787.1 (referred to as scheme 4) discloses a liquid storage and output device and a pen, which provide a technical solution in that, by squeezing and piercing the membrane capsule containing two kinds of liquids, cause the output end to discharge the luminescent ink. It is, however, difficult to discharge and mix the binary liquid simultaneously in such a solution. Although the buffer layer described in this scheme has a mixing effect, it has been found in practice that due to the chromatographic characteristics of the fibrous adsorbent material, it is a negative factor that prevents the liquid from being effectively mixed and uniformly output. Therefore, scheme 4 does not provide a specific means to control the reliability and effectiveness of the mixing step. Once a single reaction component first contacts the nib of the porous liquid-absorbing material, the nib cannot output the mixed luminescent ink normally.

BRIEF SUMMARY OF THE INVENTION

The purpose of the invention herein is to provide an output device for uniformly mixed liquid, in order to solve the problem in the current techniques of not allowing the mixed liquid to be uniformly output due to insufficient mixing of multi-component liquid and/or due to insufficient or improper venting and/or pressure balancing.

To achieve the above goal, the invention herein adopts the following technical solutions:

In one embodiment, an output device is a marker (also referred to as a pen) for writing, drawing and/or coloring with a uniformly mixed liquid such as ink, the output device comprises:

A barrel—The barrel is a hollow cylindrical structure made of a flexible material, which includes an open head end and a closed end;

A nib—The nib is embedded in the head of the barrel, and the tip of the nib extends from the head of the barrel; and A liquid chamber for retaining a volume of the liquid such as ink to flow out the marker through the nib as the user writes or colors. The liquid chamber may be a single chamber in the barrel configured to retain the liquid, or it may include one or more sub-chambers or compartments in the barrel for retaining two or more liquid components that can be mixed to form a mixed liquid for use. For example, the ink chamber may include one component of a two-component luminescent ink mixture and a glass ampoule within the ink chamber may include a second component of the two-component ink. When the glass ampoule is broken within the barrel, the two components mix to form the ink within the ink chamber.

In one embodiment, the ink chamber is a binary ink storage assembly in the barrel with two or more glass ampoules. The binary reaction solution is stored separately in multiple glass ampoules, placed in the barrel in parallel, wherein, the ratio between the cross-sectional area of the inner diameter of the barrel and the sum of the cross-sectional areas of the outer diameters of the multiple glass ampoules in the barrel is less than 3:1. Moreover, the multiple glass ampoules in the binary ink storage assembly may be arranged in pairs. The lengths and diameters of the multiple glass ampoules are equal to each other. The number of glass ampoules may range from 2 to 8. In some embodiments, the barrel is adapted to the glass ampoules, and the barrel is a cylindrical structure having an inner diameter ranging from 3 to 15 mm. Moreover, the multiple glass ampoules may correspond to the same volume of reaction solution. In some embodiments, the length of the glass ampoule is 60%-90% of the length of the inner surface of the barrel. In some embodiments, the ratio of the length to the diameter of the glass ampoule is more than 10:1. In some embodiments, the diameter of the glass ampoule ranges from 1.8 mm-5.2 mm.

In some embodiments, the barrel is a cylindrical structure made of polyethylene material. In some embodiments, the nib is a bullet-head structure made of acrylic fiber material.

In some embodiments, a vented marker with at least one vent hole may be provided to allow for the entry and exit of air between the interior and exterior of the marker. A vent channel extending from the vent hole to the interior of the ink chamber allows air to enter into the marker to replace the volume of ink that flows out of the marker via the nib as the user is writing or coloring. This enables the ink in the ink chamber to continue to flow through the nib as the user writes or colors. The vent hole and vent channel also enable the marker to achieve pressure balance in response to temperature and/or pressure changes that expand the air volume inside the ink chamber. For example, in the embodiment described previously where the marker includes multiple ampoules containing liquid components for making luminescent "glow ink", when the ampoules are broken, the liquid components react to form the glow ink. This reaction is exothermic resulting in an increase in air pressure inside the ink chamber. The vent channel extending from the ink chamber is configured to provide an area into which the ink and/or air can flow to accommodate the pressure expansion and achieve equilibrium. If there was no vent channel to allow for expansion, the increased air pressure would tend to force ink out of the marker through the nib or end plug.

In some embodiments, a spacing ring (also referred to as a "vent insert") is fixed inside the barrel on the rear side of the nib. The spacing ring is a cylindrical structure having a vent hole, and an exhaust-gap is formed between the nib and the barrel. In some embodiments, a circular base is inside the barrel and behind the spacing ring, and it fixedly connects to the rear end of the spacing ring. The circular base and the rear end of the spacing ring form a gap for the liquid to flow into the vent hole of the spacing ring from the inside of the barrel. Therein, a gap for the liquid to flow is formed between the exterior wall of the circular base and the interior wall of the barrel.

In some embodiments, the spacing ring is used as a vent insert, and its material is optimally ABS plastic. The spacing ring is a hollow cylindrical structure with open ends and has a front end facing the head of the barrel and a rear end facing the end of the barrel. The nib is embedded in the opening of the front end of the spacing ring. Its exterior wall is seamlessly assembled to the interior wall of the barrel, and the exterior side wall of the front end of the spacing ring has the first vent hole connecting the inner space of the spacing ring. The exterior side wall of the front end of the spacing ring has the first slot on the opposite side of the first vent hole. The exterior wall of the spacing ring has the first vent channel connecting the first vent hole and the first slot; wherein, the first vent channel extends along the circumferential direction with the first vent hole as a starting point and turns vertically at a point close to its own intersection towards the rear end of the spacing ring and extends circumferentially in the opposite direction, forming a spiral labyrinth structure extending spirally from the front end to the rear end of the spacing ring. After the first vent channel extends to the rear end of the spacing ring, it turns vertically at a point close to its own intersection at the rear end and extends straight to the front end of the first vent channel, connecting to the first slot. In some embodiments, a notch is formed at the front end of the spacing ring at the first slot.

In some embodiments, barrel 12 is an open structure, and an end plug is sealed at the end of barrel 12. Moreover, an exhaust gap may be formed between the end plug and the barrel, and an exhaust filter structure may be arranged on the end plug to guide the air flow to the exhaust gap. In some embodiments, the end plug is an inner hollow cylindrical structure, which has an open end toward the end of the barrel and a closed end away from the end of the barrel. The second vent hole is arranged on the open end surface of the end plug and connects to the inner space of the end plug. The second slot is arranged on the exterior side wall of the closed end of the end plug and corresponds with the second vent hole. The second vent channel is arranged on the exterior wall of the end plug to connect the second vent hole and the second slot; therein, the second vent channel extends along the circumferential direction with the second vent hole as a starting point and turns vertically at a point close to its own intersection towards the closed end of the end plug and extends circumferentially in the opposite direction, forming a spiral labyrinth structure extending spirally from the closed end to the closed end of the end plug. After the second vent channel extends to the closed end of the end plug, it turns vertically at a point close to its own intersection at the closed end and extends straight to the closed end of the end plug, connecting to the second slot.

In some embodiments, the end plug is comprised of a plug-in tube post and a circular end cap that is integrally formed from the open end to the closed end. The diameter of the plug-in tube post is smaller than the inner diameter of the end of the barrel, and the diameter of the circular end cap is longer than or equal to the outer diameter of the end of the barrel, wherein the second slot extends onto the circular end cap.

Based on the aforementioned output device, the invention herein also provides a preparation method, including:

the preparation of a plurality of output devices with different structural combinations in accordance with variable factors, including the specifications of the barrel and the glass ampoules, the material of the nib, and the viscosity of the mixed liquid; obtaining multiple control groups based on the same variable factor by summarizing and grouping multiple output devices that conform to a single-variable factor; combining multiple control groups under the same variable factor for drawing and writing experiments, collecting luminescence parameters of the mixed luminescent liquid output in the multiple control groups, and evaluating and selecting the optimal solution for the uniform output of the mixed luminescent liquid under a single-variable factor based on the luminescence parameters between the control groups; determining the optimal combination scheme of the specifications of the barrel and the glass ampoules, the material of the nib, and the mixed liquid viscosity according to the optimal solution selected under multiple variable factors.

Moreover, the method for determining the specifications of the barrel and the glass ampoules includes: the method of dye calibration was used to equip output devices with glass ampoules of different diameters to form two control groups. The binary reaction solution was externally marked using dyes. Based on the wavelengths of different color dyes absorbed by the binary reaction solution, the mixed luminescent liquids of the two control groups were output to the corresponding paper, and by measuring the ink marks of the mixed luminescent liquids in the two control groups on the paper at the initial, middle and final stages of drawing and writing experiment, the mixing characteristics of the binary reaction solutions in the two control groups were evaluated according to the concentration changes of the two dyes in the collected ink marks, and the ratio between the cross-sectional area of the inner diameter of the barrel and the sum of the cross-sectional areas of the outer diameters of the multiple glass ampoules in the barrel was determined.

Moreover, the barrels of the output devices of the two control groups have the same size. The control group with the larger glass ampoule diameter is the output device with two glass ampoules, which are filled with luminescent liquid and activation liquid respectively;

the control group having a small glass ampoule diameter is an output device with four glass ampoules, two of which are filled with luminescent liquid, and the rest are filled with activation liquid.

Moreover, the method for determining the specifications of the barrel and the glass ampoules includes: multiple control groups were formed by equipping output devices with different numbers of glass ampoules, and the mixed luminescent liquids of the multiple control groups were output onto the paper to draw corresponding lines. The lengths of the drawing lines in each control group were measured from the starting points to the luminescence positions. According to the lengths of the drawn lines, the mixing characteristics of the binary reaction solutions in the multiple control groups were evaluated, and the ratio between the cross-sectional area of the inner diameter of the barrel and the sum of the cross-sectional areas of the outer diameters of the multiple glass ampoules in the barrel was determined.

Moreover, the multiple control groups comprise:

an output device with two glass ampoules, the cross-section of the barrel being oval-shaped;

an output device with two glass ampoules, the cross-section of the barrel being circular;

an output device with more than two glass ampoules, the cross-section of the barrel being circular;

wherein, the inner diameter of the barrel is adapted to the number of glass ampoules, and the inner diameter of the barrel with more glass ampoules is longer than the inner diameter of the barrel with fewer glass ampoules.

Moreover, the method for determining the material of the nib includes: multiple control groups were formed by equipping output devices with nibs of different materials. According to the recorded and calculated average time from when the binary reaction solutions of the control groups were mixed until the nib became wet, the lengths of the lines drawn with the mixed luminescent liquids from the non-luminescence points to the luminescence positions, and the degree of luminescence of the output devices output onto the paper, the mixing characteristics of binary reaction solutions in multiple control groups were evaluated, and the optimal material scheme for the nib was determined.

Moreover, the method for determining the viscosity of the mixed liquid includes: multiple luminescent liquids of different viscosities and multiple activation liquids of different viscosities were respectively prepared and grouped in pairs into multiple output devices containing luminescent liquids and activation liquids to form multiple control groups. The binary reaction solution was externally marked using dyes. Based on the wavelengths of different color dyes absorbed by the binary reaction solution, the mixed luminescent liquids of the multiple control groups were output to the corresponding paper, and the concentrations of two dyes of the ink marks left by the mixed luminescent liquids in each control group were measured, and the ideal central value was set. According to the concentration ratio of the two dyes in the control groups, the discrete state of the mixing state and the ideal central value of the luminescent liquids and the activation liquids in the control groups were obtained by formula calculation. The mixing characteristics of the binary reaction solution in multiple control groups were evaluated, and therefrom the optimal viscosity range of the binary reaction solution was determined.

Moreover, by determining the mix liquid viscosity, the viscosity range for the best mixing effect is confirmed, that is the viscosity ratio between the luminescent liquid and the activation liquid starts at 0.6-1.6, with any combination where the viscosity of both liquids is consistent or close.

Moreover, by determining the mix liquid viscosity, the viscosity range of the best mixing effect is confirmed, that is any combination of the luminescent liquid viscosity ranging from 35-253.5 cpp and the activation liquid viscosity ranging from 20-235 cpp.

Moreover, by determining the mix liquid viscosity, the viscosity range of the best mixing effect is confirmed, that is any combination of the luminescent liquid viscosity ranging from 80-180 cpp and the activation liquid viscosity ranging from 70-176 cpp.

The invention herein has the following beneficial effects due to the adoption of the above technical solutions:

1. The most suitable specifications of the barrel, the nib, the glass ampoules, and the binary reaction solution were selected by preparing the output device comprising a barrel, a nib, an end plug, a binary ink storage assembly and the binary reaction solution viscosity, and conducting evaluation based on the experiment on the barrel, the nib, the glass ampoules and the viscosity of the binary reaction solution. An optimal combination of these components was determined, which therefore resulted in a reliable, simple and low-cost output device for solving the problem of not allowing the liquid to be uniformly mixed and output when the chemiluminescent pen was activated.

2. By placing a vent structure between the nib and the barrel and between the end plug and the barrel, a space for a large amount of liquid to flow in the vent channel is provided as required. Therefore, when the ink in the cavity is exhausted while writing and coloring, the device can keep the pressure inside the barrel and the nib balanced, assuring that, when a chemiluminescent pen is activated, the liquid can be output uniformly, thus avoiding leakage of ink from the barrel.

Exemplary embodiments of the invention herein will be described in more detail below with reference to the attached drawings. While exemplary embodiments of the invention herein are shown in the drawings, it shall be understood that the invention herein may be embodied in various forms and shall not be limited by the embodiments set forth herein. Rather, these embodiments are provided so that the invention herein will be more thoroughly understood and will fully convey the scope of the invention herein to those skilled in the art.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

Figure 1:
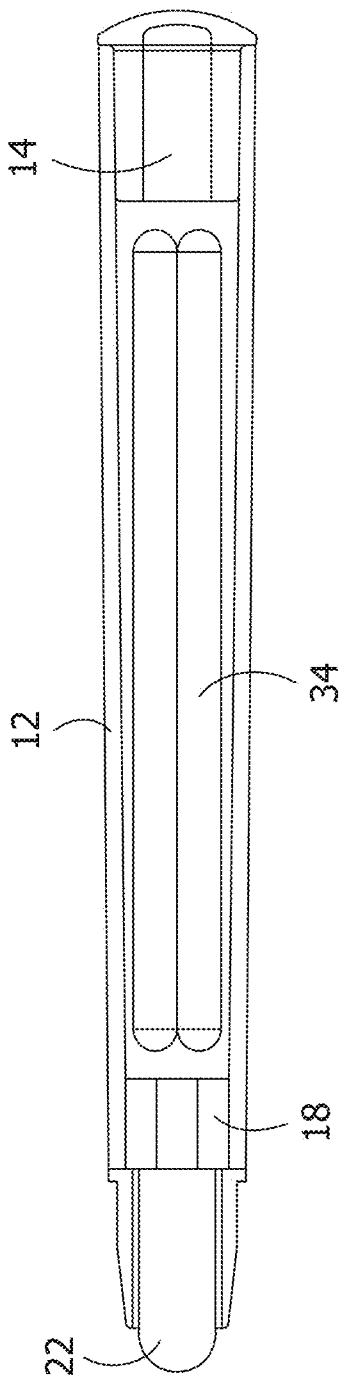
FIG. 1 is a schematic diagram of the overall structure of an output device for uniformly mixed liquid in accordance with a first embodiment of the invention herein.
Figure 2:
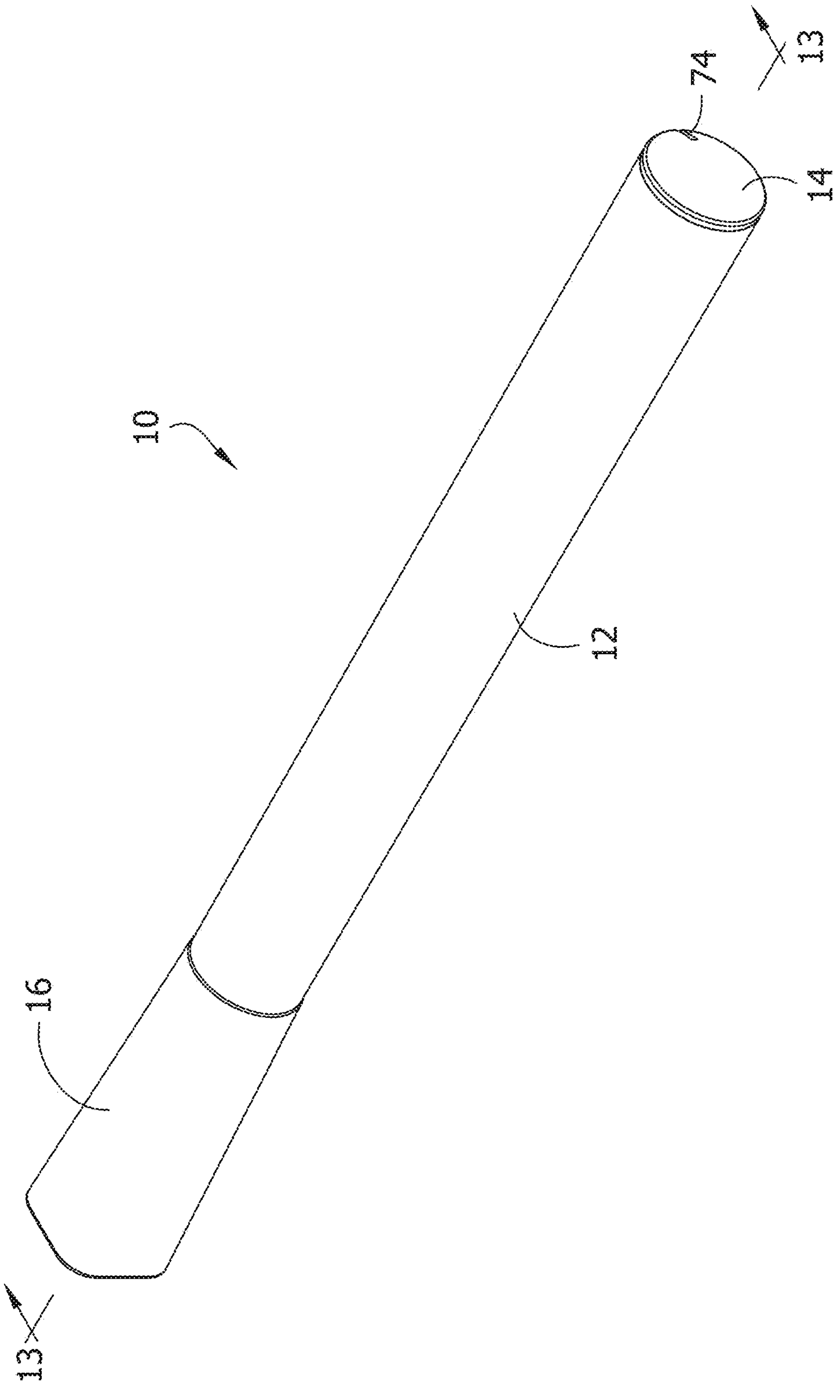
FIG. 2 is a perspective view of a vented marker in accordance with a second embodiment of the invention herein.

The numbers in the drawings are indicated as follows: 12. barrel; 22. nib; 14. end plug; 64. second vent hole; 74. second slot; 26. second vent channel; 28. plug-in tube post; 30. circular end cap; 34. glass ampoule(s); 18. spacing ring; 58. first vent hole; 50. first slot; 46. first vent channel; 52. notch; 38. circular base; 16. cap.

DETAILED DESCRIPTION OF PREFERRED EMBODIMENT

Current output devices of mixed multicomponent liquids cannot uniformly output the liquid due to insufficient mixing and/or due to insufficient or improper venting or pressure balancing. Therefore, based on the existing liquid mixing output devices, the invention herein conducted a drawing and writing experiment on the barrel of the output device, the glass ampoules containing the binary reaction liquid and the nib structure using the mixture of binary reaction liquids based on single-variable factors. According to a variety of single-variable factors, an optimal solution was selected to determine the specifications of the barrel and the glass ampoules, the material of the nib, and the mixed liquid viscosity, which therefore resulted in a reliable, simple and low-cost output device for solving the problem of not allowing the liquid to be uniformly mixed and output when the liquid mixing output device was activated.

The scheme of the invention herein will be described in detail based on the following embodiments.

Embodiment 1

As shown in FIG. 1, the invention herein provides an output device 10 for uniformly mixed liquid, including barrel 12, nib 22, and the binary ink storage assembly. The specific arrangement is as follows:

Barrel 12 is a hollow cylindrical structure made of a flexible material, which includes an open head end and a closed end. Optimally, barrel 12 is a cylindrical structure made of low-pressure polyethylene. Nib 22 is embedded in the head of barrel 12, and the tip of the nib 22 extends from the head of barrel 12 as the output end of the output device. Optimally, nib 22 is a bullet-head structure made of acrylic fiber material. A binary ink storage assembly includes two or more glass ampoules 34. The binary reaction solution is stored separately in multiple glass ampoules 34, placed in barrel 12 in parallel. The ratio between the cross-sectional area of the inner diameter of barrel 12 and the sum of the cross-sectional areas of the outer diameters of multiple glass ampoules 34 in barrel 12 is less than 3:1, optimally less than 2:1.

Figure 3:
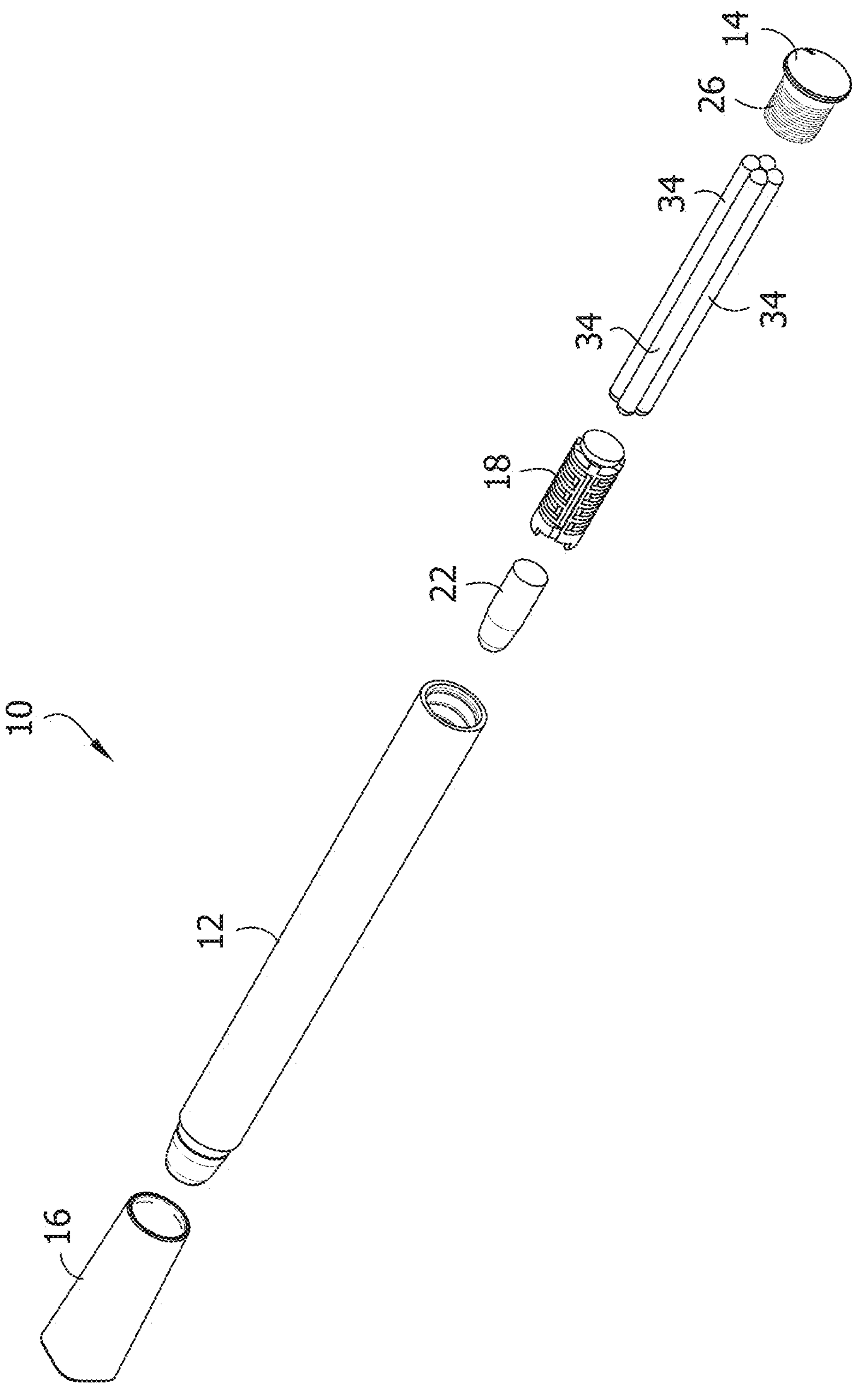
FIG. 3 is an exploded view of the vented marker of FIG. 2.
Figure 4:
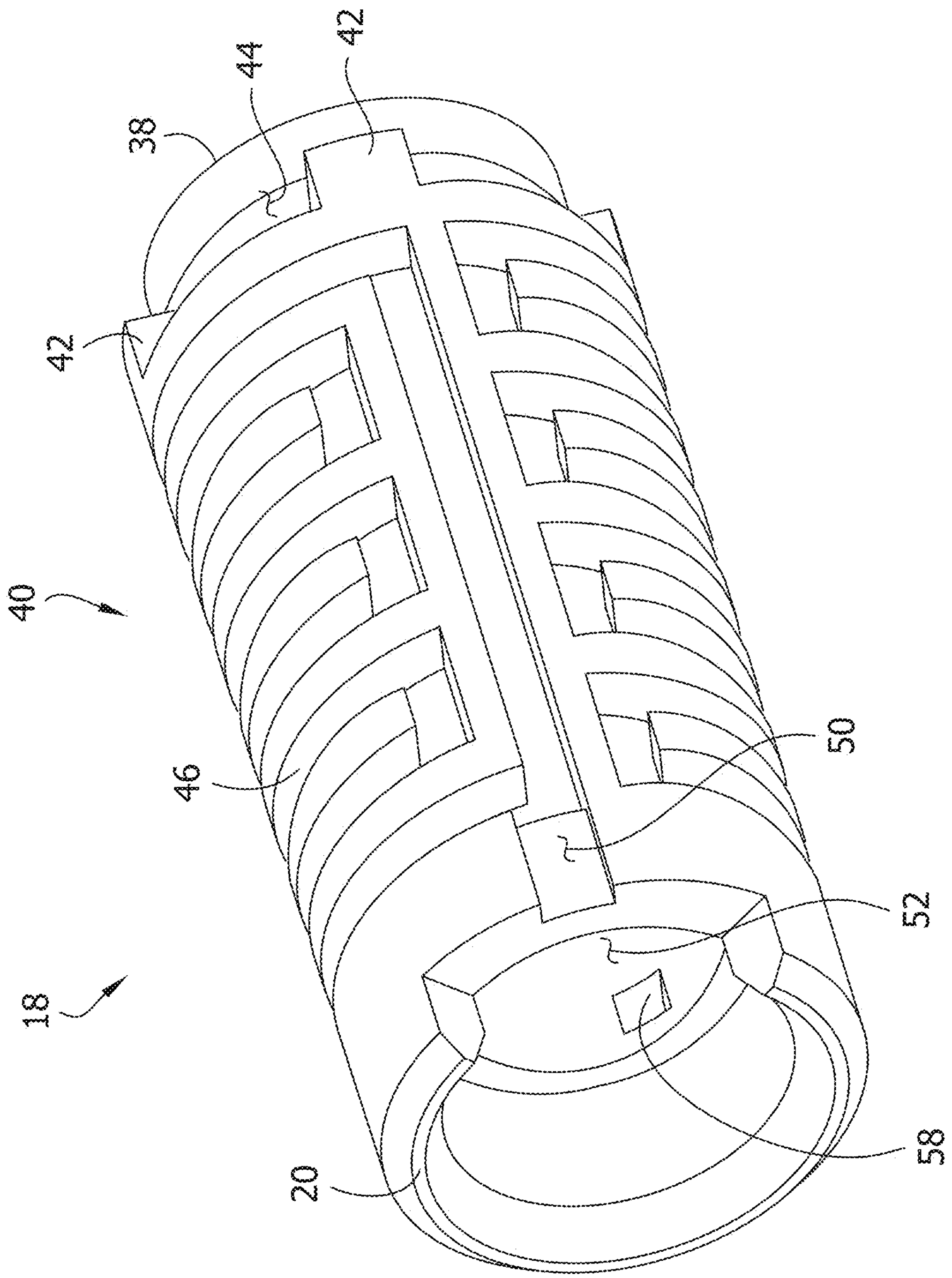
FIG. 4 is a perspective view of the vent insert of the vented marker of FIG. 2.
Figure 5:
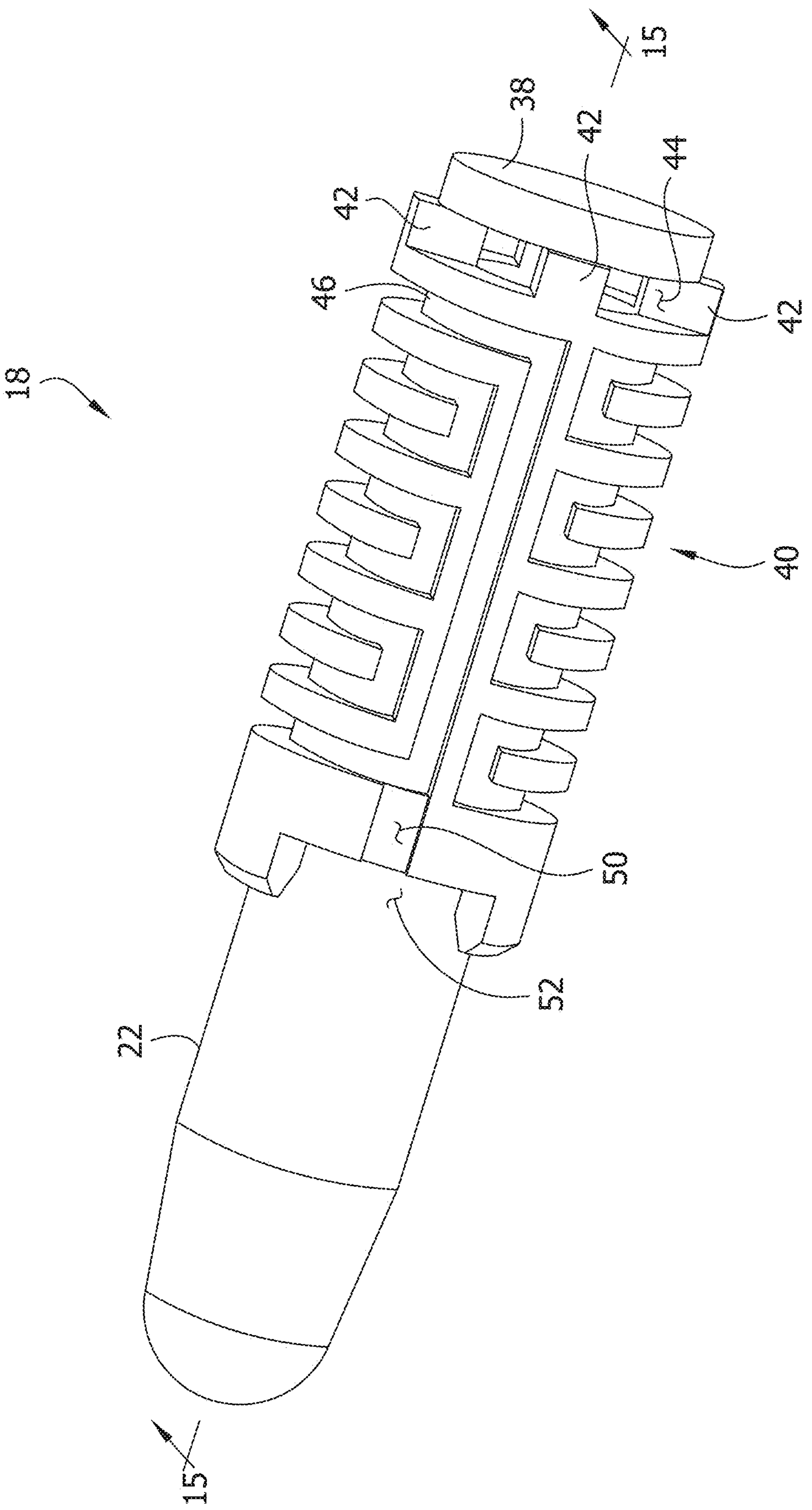
FIG. 5 is another perspective view of the nib and vent insert of the vented marker of FIG. 2.

In the embodiment shown in FIG. 3, multiple glass ampoules 34 in the binary ink storage assembly are arranged in pairs. The lengths and diameters of the multiple glass ampoules are equal to each other. The number of glass ampoules ranges from 2 to 8. Optimally, the number of the glass ampoules 34 should be 4, 6 or 8, while 4 is the optimal option. Based on the number of glass ampoules 34, barrel 12 is adapted to the glass ampoules 34. Barrel 12 is a cylindrical structure with an inner diameter ranging from 3-15 mm, optimally 5-12 mm, while barrel 12, having an inner diameter of 11 mm, should be paired with four glass ampoules 34 with an outer diameter of 4 mm.

In another method for the parallel arrangement of the aforementioned glass ampoules 34, when installed as a pair, one glass ampoule 34 is placed into another slightly larger glass ampoule 34. In view of the fact that, when activated, the two inner and outer glass cores are not synchronized, another pair of glass ampoules 34 in opposite charging order can also be arranged in pairs, which can also achieve the equivalent effect of the above paired arrangement.

Moreover, in some embodiments, multiple glass ampules 34 may correspond to the same volume of reaction solution. In some embodiments, the length of glass ampoule 34 is 60%-90% of the length of the inner space of barrel 12. In some embodiments, the ratio of the length to the diameter of glass ampoule 34 is more than 10:1, optimally more than 15:1. In some embodiments, the diameter of glass ampoule 34 ranges from 1.8-5.2 mm, optimally 2.1-4.3 mm. In some embodiments, the level of the fluid inside glass ampoule 34 is greater than 50% of the length of glass ampoule 34, optimally 75%.

Through the aforementioned structural arrangement, in the invention herein, the most suitable specifications of barrel 12, nib 22, and glass ampoules 34 were selected by conducting evaluation based on the experiment on barrel 12, nib 22, and glass ampoules 34. An optimal combination of these components was determined, which therefore resulted in a reliable, simple and low-cost output device for solving the problem of not allowing the liquid to be uniformly mixed and output when the chemiluminescent pen was activated.

Spacing ring 18 is fixed inside barrel 12 on the rear side of nib 22 as a buffer between nib 22 and glass ampoules 34, so that nib 22 will not back up. Therein, spacing ring 18 is a cylindrical structure having a vent hole. In addition to the annular hole in the center, it can also be a star-shaped column with gaps, so that spacing ring 18 can filter and discharge gas. Therein, an exhaust gap is formed between nib 22 and barrel 12.

Embodiment 2

As shown in FIGS. 2-6 and 13-17, embodiment 2 differs somewhat from embodiment 1 in the exhaust filter or vent structures. Referring to FIGS. 2-6 and 13-17, a vented marker in accordance with one embodiment of the invention is denoted by reference number 10. The marker 10 includes a barrel 12, an end plug 14, and a cap 16. The barrel 12 is generally cylindrical is shape with open ends. The first end of the barrel 12 houses a cylindrical vent insert 18 (also referred to as a "spacing ring"). The forward end of the vent insert 18 defines an opening 20 (FIG. 4) sized and shaped to receive a nib 22. Vent insert 18 fits snugly and wholly within the barrel 12. A rear portion of the nib 22 is received within the open front end 20 of insert 18 within barrel 12 and a tip portion of the nib 22 is outside of the barrel 12, allowing the user to write or color with the tip portion of the nib 22. The cap 16 fits over the nib 22 to prevent unintended markings or drying out of the ink and forms a snap-fit connection with the barrel 12.

The interior of the barrel 12 defines an ink reservoir 32 for containing ink. As described previously, some or all of the components for the ink may be included within one or more ampoules 34 within the ink reservoir 32. In those embodiments, the ink is formed when the ampoules are broken and the ink components mix and react with one another within the ink reservoir. This type of system is particularly useful for activating glow-in-the-dark inks, where the glow-in-the-dark properties are achieved for a period of time after mixing and reacting the components.

Vent insert 18 is generally hollow extending from the open front end 20 to a rear end defined by circular base 38. Base 38 is slightly smaller in diameter than the barrel 12 such that gaps are formed between the walls of the barrel 12 and the base 38 around the edges of base 38. This allows passage of ink around base 38 from ink reservoir 32 to an ink chamber 54 formed in the hollow main body 40 of vent insert 18, while preventing passage of larger particles (such as glass pieces) that may have been created during breakage of one or more ampoules 34.

Base 38 is set off a distance from main body 40. Main body 40 and base 38 are coupled to each other via legs 42. Legs 42 extend rearward from main body 40 at spaced intervals around the perimeter of main body 40, thereby leaving gaps 44 interspaced between the legs 42. Gaps 44 allow access for ink to flow from ink reservoir 32 to ink chamber 54. Ink chamber 54 retains the ink in contact with the rear portion of nib 22 to supply ink to nib 22 for writing or coloring.

Vent channel 46 is an elongated closed channel extending from a first open end 58 (FIG. 15) to a second open end 50 (FIG. 4) between the outer surface of main body 40 and the interior surface of barrel 12. Open end 58 is defined by an aperture extending through main body 40 near forward end 20 between the ink chamber 54 and the outer surface of main body 40. Open end 58 provides a passageway for fluid flow (ink and air) between ink chamber 54 and the vent channel 46. Second open end 50 is defined by a slot 50 in the outer surface of the main body 40 adjacent forward end 20. Second open end 50 provides a passageway for fluid flow (air) to and from outside the barrel 12 to the vent channel 46. In some embodiments, slot 50 can be present on a notch 52 (FIG. 4) formed along the forward end 20 of the insert.

The closed walls of the vent channel 46 are formed by grooves inset within the outer surface of main body 40 and by the interior surface of barrel 12. The outer surface of main body 40 is in tight abutting contact with the interior surface of barrel 12 such that fluid within vent channel 46 cannot escape the vent channel between the vent insert 18 and barrel 12. In this manner, vent channel 46 is a closed channel defining a single, continuous path from a single port 50 on the exterior of the marker to a single port 58 within the interior of the marker. Fluid (ink and air) can only flow into and out of the channel through the open ends 50 and 58.

In the embodiment shown in the drawings, vent channel 46 has a generally square shaped cross-section and extends in a helical labyrinth type pattern snaking around the main body by following the circumference of the main body 40 until close to an intersection with itself, making a generally perpendicular turn, then traveling the circumference of the main body 40 in the opposite direction. However, a variety of different channel shapes and patterns can be utilized, such as a helical spiral, double spiral, or labyrinth with half-round, square, or rectangular cross-sections. In order to accommodate overflow of ink resulting from changes in air pressure, a relatively long vent channel 46 may be provided to accommodate a significant volume of ink to flow into the channel as needed to maintain equilibrium and avoid leaking of the ink from the marker. The length of the vent channel 46 from end 58 to end 50 can be, for example, at least about 3 times the circumference of the main body 40, at least 4 times the circumference of the main body 40, or at least 5 times the circumference of the main body.

It is understood by those skilled in that art that the design (size, cross-sectional configuration, and pattern) of the vent channel 46 may vary depending on a number of factors and can be adjusted to optimize the pressure balance of the ink at the nib (marker tip). The design is intended to achieve pressure balancing or equalization between the ink cavity pressure and total pressure at the nib or tip of the marker as writing or coloring depletes the ink within the cavity. The design will also need to take into account the volume of ink that is anticipated to be displaced by changes in pressure and temperature, such that the channel is of sufficient size to accommodate the anticipated volume of ink without leaking when those changes occur. For example, the amount of ink that may be displaced by changes in air pressure resulting from the reaction of the glow ink components. Parameters including the physical properties of the ink, such as surface tension, specific gravity, viscosity, and vapor pressure may also be considered in determining the size and configuration of the vent channel 46 to optimize its functionality. Pressure variations including the head pressure of the ink may be balanced and offset by capillary pressures. The cross-sectional area of the vent channel 46 may be designed to achieve proper capillary pressure to balance the system in static and dynamic applications. This capillary pressure in the vent channel 46 is a function of the surface tension of the liquid and surface energy of the vent channel material. Thus, the vent channel 46 may be designed so that pressure variations at the nib are offset by capillary pressures at the ink/air interface at any point along the vent channel 46. Equilibrium pressures include the capillary pressure provided by the nib material (analogous to the meniscus of ink forming on a tubular tip). Determining the ideal geometry of the vent channel 46 based on these factors is readily within the purview of the skilled person.

In the embodiment shown in FIGS. 3, 6, 13 and 17, end plug 14 includes an end plug vent channel 26, although it should be understood that end plug 14 may alternatively be provided as a standard, solid end plug without a vent channel. Providing an additional vent channel 26 in the end plug can be particularly beneficial where a significant change in the vapor pressure within the barrel is anticipated. For example, as discussed above, the reaction of the glow ink components may increase the internal vapor pressure significantly when the ampoules 34 are broken and the components mix to react and form the glow ink. In that circumstance, having an additional port at the rear end of the marker for air to vent and an additional vent channel for ink to flow may be useful to avoid ink leaking from the marker and achieve proper ink flow through the nib.

Figure 6:
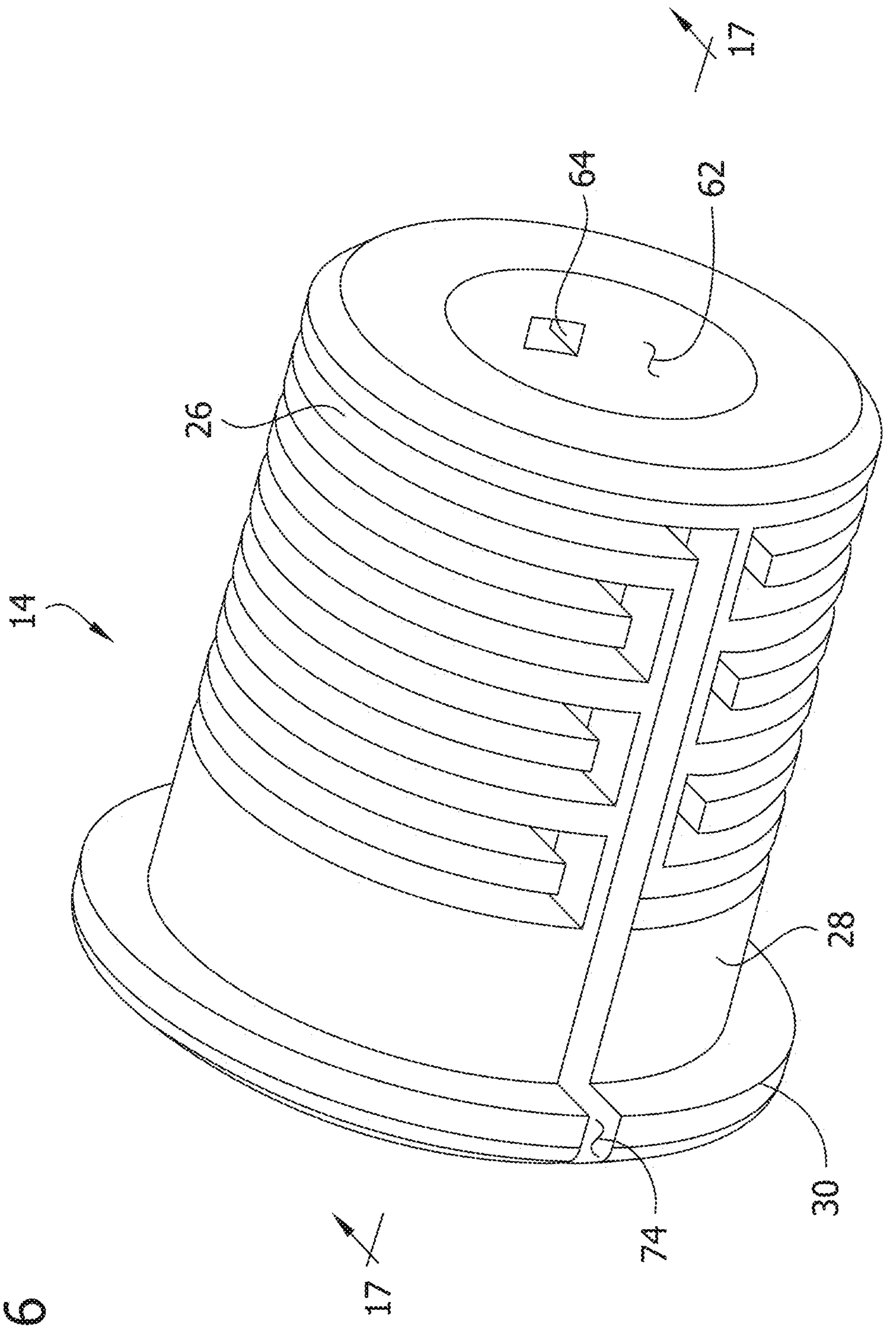
FIG. 6 is a perspective view of the end plug of the vented marker of FIG. 2.
Figure 13:
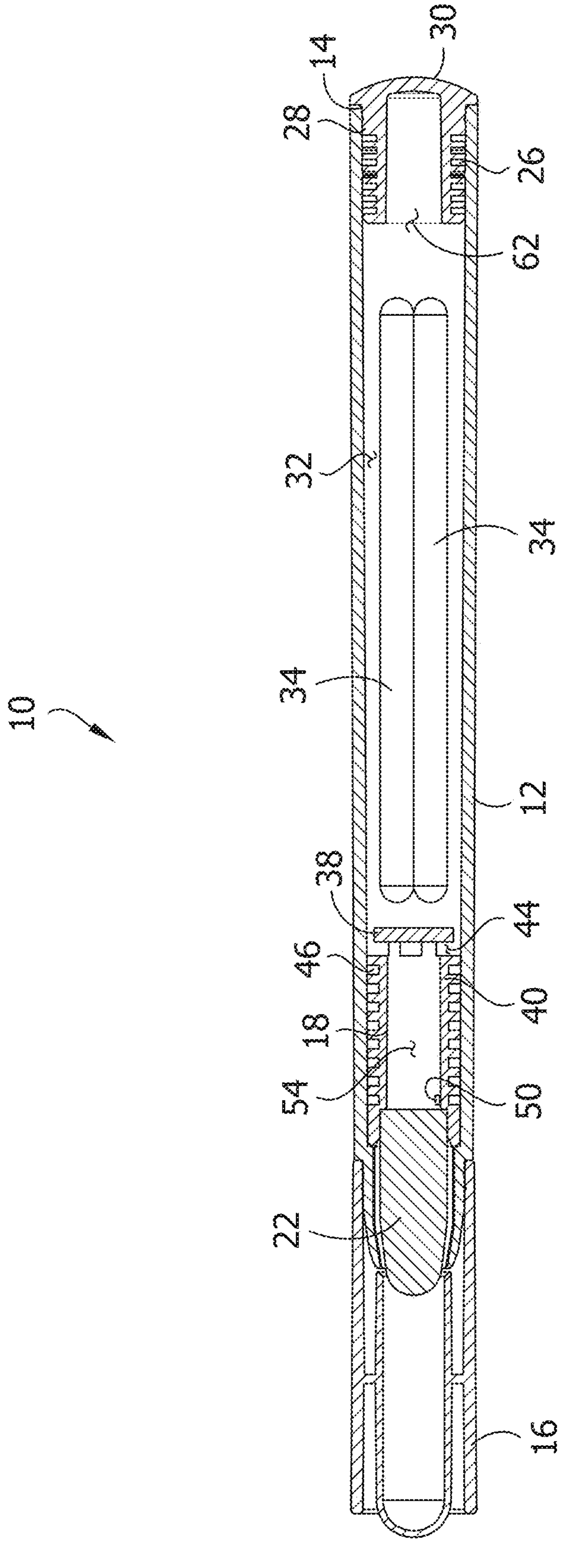
FIG. 13 is a cross-sectional side plan view of the vented marker taken through the 13-13 line of FIG. 2.
Figure 14:
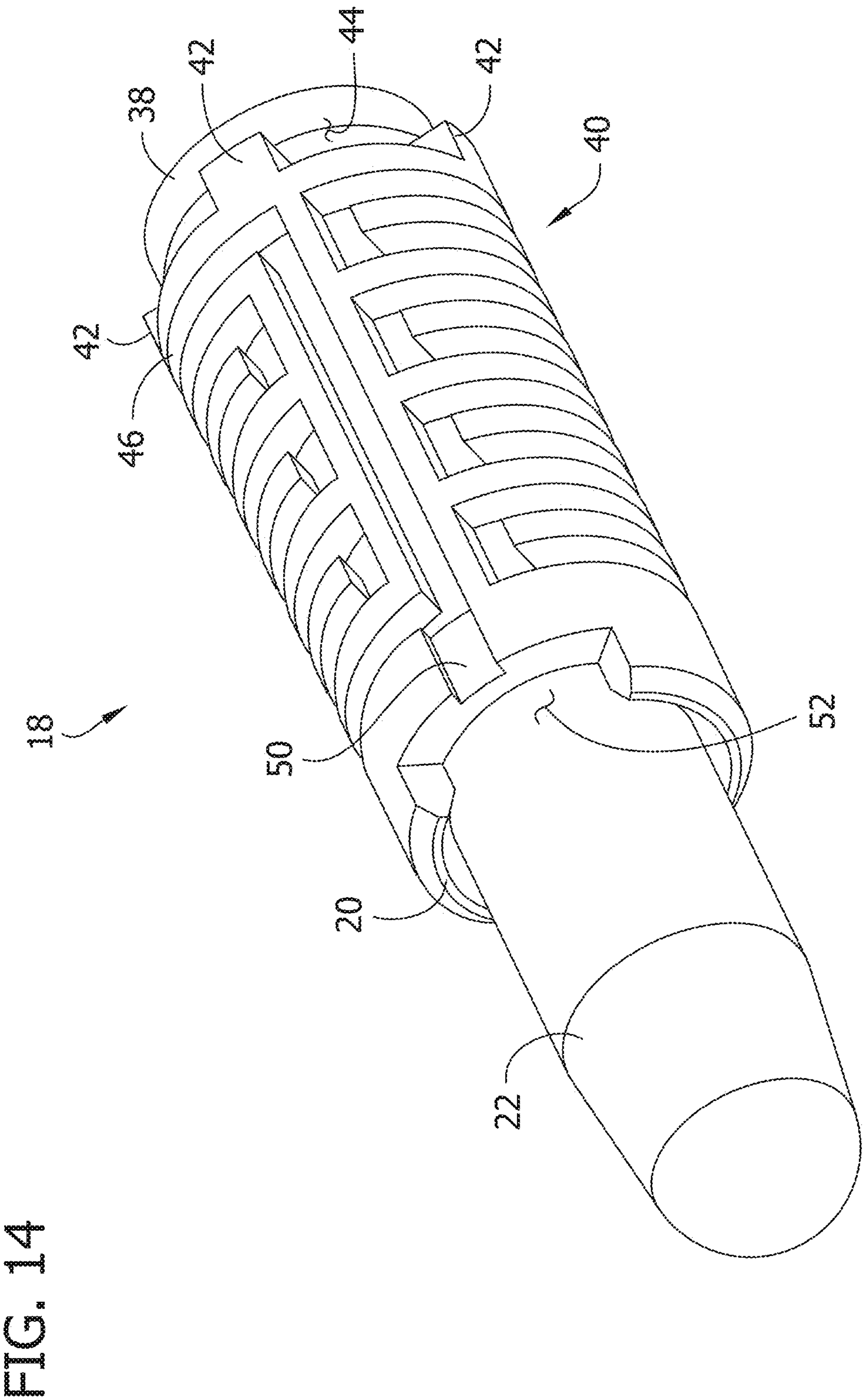
FIG. 14 is a perspective view of the nib and vent insert of the vented marker of FIG. 2.
Figure 15:
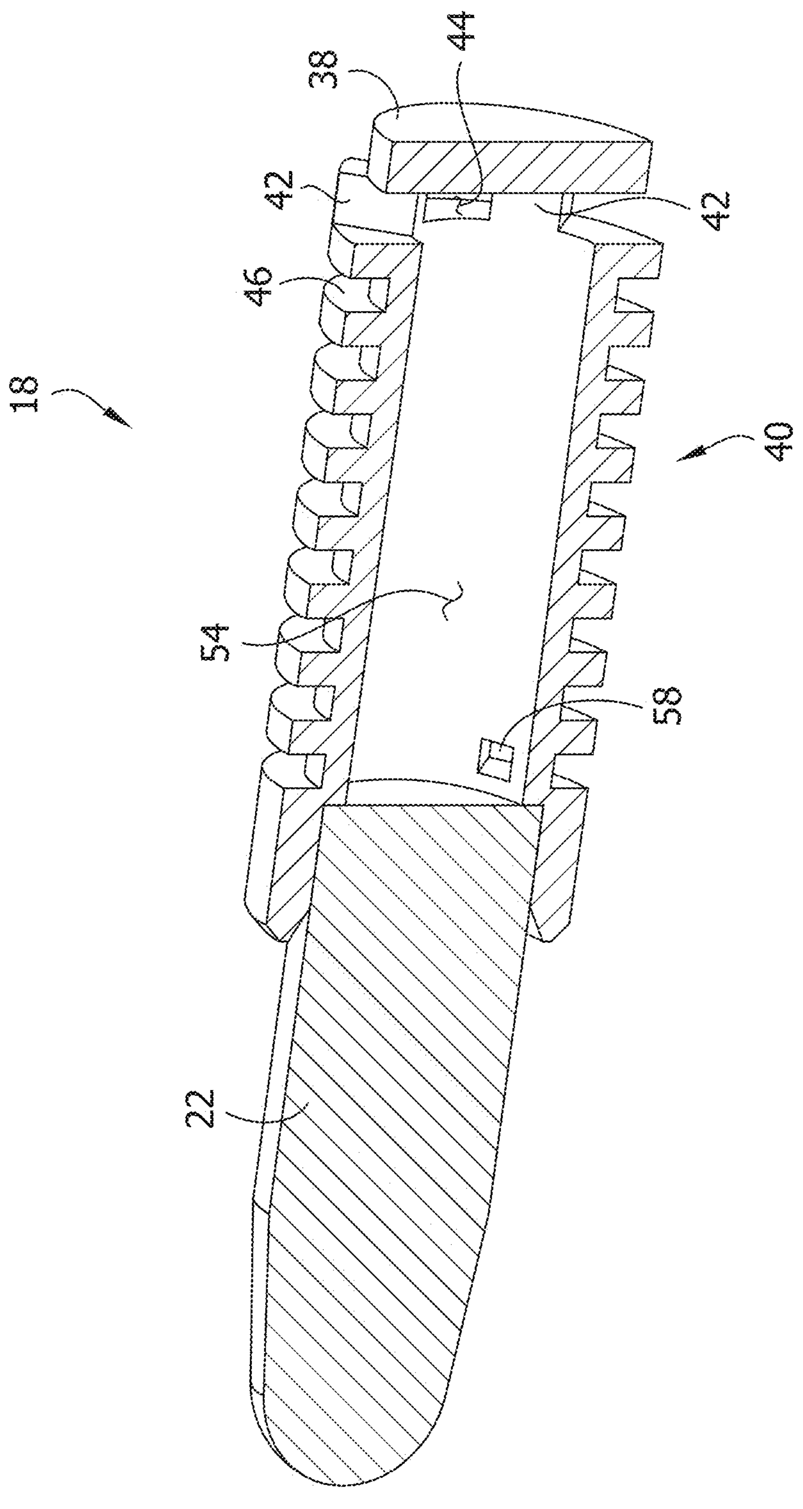
FIG. 15 is a cross-sectional view of the nib and vent insert taken through the 15-15 line of FIG. 5.
Figure 16:
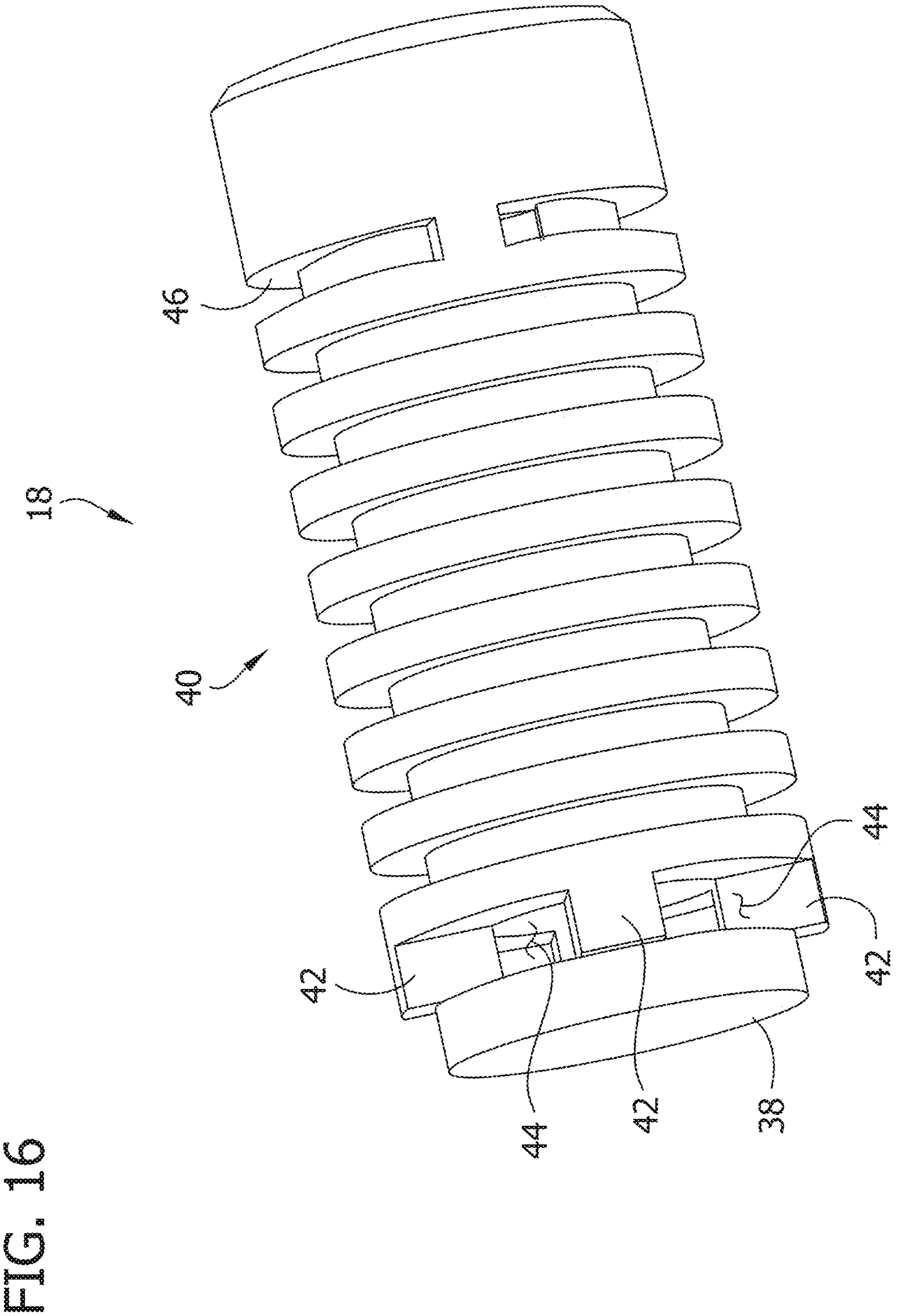
FIG. 16 is side view of the vent insert of the vented marker of FIG. 2.
Figure 17:
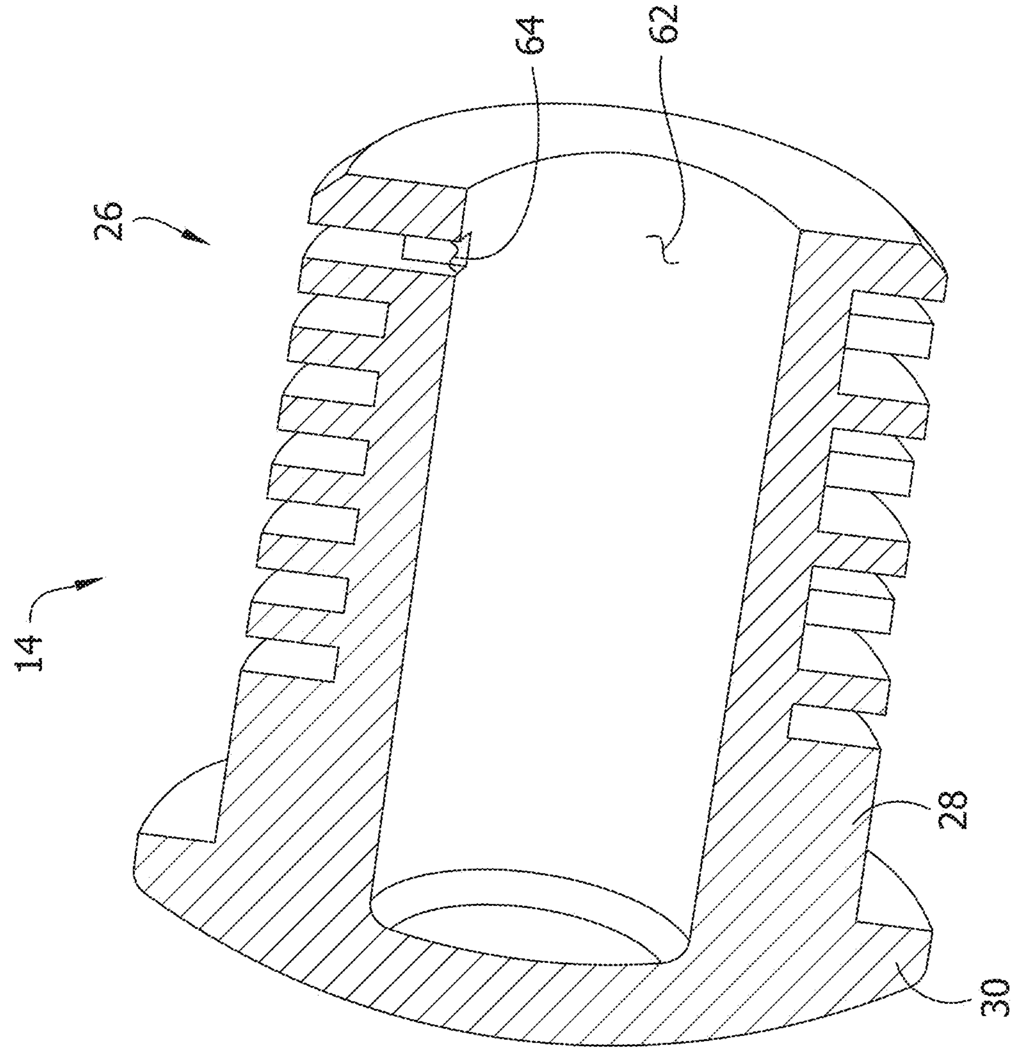
FIG. 17 is a cross-sectional side view of the end plug taken through line 17-17 of FIG. 6.

As seen in FIGS. 6, 13 and 17, end plug 14 has a tubular front portion 28 that is sized and shaped to be snugly received within the inside of the barrel 12 and a rear circular end cap 30 that is sized and shaped so that it is the same or similar diameter to the diameter of the marker barrel 12 and remains outside the marker barrel 12 upon insertion of the tubular front portion 28. End plug 14 generally comprises a hollow, cylindrical body extending from an open forward end 62 to the closed rear end cap 30. Open end 62 allows for access of ink contained in the ink reservoir to flow into the hollow center of end plug 14. Vent channel 26 is an elongated closed channel extending from a first end port 64 to a second end port 74 (FIG. 6) between the outer surface of tubular front portion 28 and the interior surface of barrel 12.

First end port 64 is defined by an aperture extending through tubular front portion 28 near open end 62 between the hollow interior and the outer surface of tubular front portion 28. First end port 64 provides a passageway for fluid flow (ink and air) between the hollow interior of tubular front portion 28 and the vent channel 26. Second end port 74 is defined by a slot in end cap. Second end port 74 provides a passageway for fluid flow (air) to and from outside the barrel 12 to the vent channel 26.

The closed walls of the vent channel 26 are formed by grooves inset within the outer surface of tubular front portion 28 and by the interior surface of barrel 12. The outer surface of tubular front portion 28 is in tight abutting contact with the interior surface of barrel 12 such that fluid within vent channel 26 cannot escape the vent channel between the end plug 14 and barrel 12. In this manner, vent channel 46 is a closed channel defining a single, continuous path from a single port 74 on the exterior of the marker to a single port 64 within the interior of the marker. Fluid (ink and air) can only flow into and out of the channel through the open ends 74 and 64.

In the embodiment shown in the drawings, vent channel 26 has a generally square shaped cross-section and extends in a labyrinth type pattern snaking around the outer surface of tubular front portion 28 by following the circumference of the front portion 28 until close to an intersection with itself, making a generally perpendicular turn, then traveling the circumference of the front portion 28 in the opposite direction. However, any pattern of channel 26 can be utilized, such as a spiral, double spiral, or labyrinth with half-round, square, or rectangular cross-sections. In order to accommodate overflow of ink resulting from changes in air pressure, it is desirable to have a relatively long vent channel 26 so as to provide space for a significant volume of the ink to flow within the channel as needed to maintain equilibrium and avoid leaking of the ink from the marker. The length of the vent channel 26 from end 64 to end 74 can be, for example, at least about 3 times the circumference of the tubular front portion 28, at least 4 times the circumference of the tubular front portion 28, or at least 5 times the circumference of the tubular front portion 28.

As discussed in relation to vent channel 46, it should be understood by those skilled in that art that the size and configuration of the vent channel 26 should be sufficient to retain the volume of ink that is anticipated to be displaced at various different temperatures and pressures. Parameters including the physical properties of the ink, such as surface tension, specific gravity, viscosity, and vapor pressure should be considered in determining the size and configuration of the vent channel 26 to optimize its functionality.

Spacing ring 18 may be made of ABS material (ABS plastic is a terpolymer consisting of three monomers: acrylonitrile (A), butadiene (B), and styrene (S), and the relative content of the three monomers can be changed arbitrarily and made into various resins).

As mentioned above, the exterior wall of spacing ring 18 fits tightly and completely within barrel 12. Moreover, circular base 38 is inside barrel 12 and behind spacing ring 18. Circular base 38 fixedly connects to the rear end of spacing ring 18. Circular base 38 and the rear end of the spacing ring 18 form a gap for the liquid to flow into the vent hole of spacing ring 18 from the inside of barrel 12. Therein, the diameter of circular base 38 is slightly smaller than the inner diameter of barrel 12, forming a gap for the liquid to flow between the exterior wall of circular base 38 and the interior wall of barrel 12. By this arrangement, the mixed liquid around circular base 38 can flow from barrel 12 to spacing ring 18, and, at the same time, block the large particles, such as broken glass pieces, generated when one or more glass ampoules 34 are broken. In this arrangement, circular base 38 not only serves as a blocking device against the broken glass pieces, but also serves another important function. The mixture of the luminescent liquid/activation liquid, which may not be fully mixed evenly at startup, stays here for a while to contact and mix. This can be confirmed by experiments showing that the use of spacing ring 18 with a circular base 38 is more effective than direct use of spacing ring 18 to prevent the serious mixing disparity in the high viscosity liquid test, and therefore enhances the application of high viscosity ink.

For example, evaluation method D in embodiment 3 below is used to make the output device for the high viscosity luminescent liquid/activation liquid in the glass ampoules 34. Therein, the viscosity of the luminescent liquid is 330 ccp and that of the activation liquid is 300 ccp. Ten devices are made using spacing rings 5 with circular base 38, and ten devices are made using spacing rings 5 without circular base 38. According to evaluation method D, the output devices are activated to test the mark distribution ratio of the red and blue dyes in the first stroke after the nib is wet. If either the measured red dye concentration (Ca) or the blue dye concentration (Cb) is 0 ppm, this is recorded as a serious non-uniform mixing event.

Based on experiments, the output devices made of spacing ring 18 with circular base 38 have zero non-uniform mixing event. The output devices made of spacing ring 18 without circular base 38 have 3 non-uniform mixing events.

In addition, the material selection of spacing ring 18 also affects the output of the luminescent liquid/activation liquid. When PP (polypropylene) or PE (polyethylene) and other inert non-polar materials that are mixed with the luminescent liquid/activation liquid are used, the ink output is uneven, while, when using ABS or PC (polycarbonate), PC-ABS, TPU (polyurethane), AS, PS and other plastic materials with polar functional groups, the mixed luminescent liquid/activation liquid is output smoothly.

Based on the arrangement of the above structure, the vent channel extending from the vent hole to the interior of barrel 12 allows air to enter the output device to replace the volume of ink flowing from the output device via the nib as the user writes or colors. This enables the ink inside barrel 12 to continue to flow through the tip while the user is writing or coloring, and also enables the output device to respond to temperature and/or pressure changes that expand the volume of air within barrel 12 through the vent holes and vent channels to achieve pressure balance.

Embodiment 3

The invention herein also provides a preparation method comprising:

- the preparation of a plurality of output devices with different structural combinations in accordance with variable factors, including the specifications of barrel 12 and glass ampoules 34, the material of nib 22, and the viscosity of the mixed liquid;
- obtaining multiple control groups based on the same variable factor by summarizing and grouping multiple output devices that conform to a single-variable factor;
- combining multiple control groups under the same variable factor for drawing and writing experiments, collecting luminescence parameters of the mixed luminescent liquid output in the multiple control groups, and evaluating and selecting the optimal solution for the uniform output of the mixed luminescent liquid under a single-variable factor based on the luminescence parameters between the control groups;
- determining the optimal combination scheme of the specifications of barrel 12 and glass ampoules 34, the material of nib 22, and the mixed liquid viscosity according to the optimal solution selected under multiple single-variable factors. As mentioned above, an evaluation method A is provided below:

Since the chemiluminescence intensity varies continuously with time, temperature, environment, etc., it is difficult to measure the luminescence intensity written to the paper surface to evaluate the mixed output. Therefore, the invention herein also provides a method for evaluating the specifications of barrels and glass ampoules, including: the method of dye calibration was used to equip output devices with glass ampoules 34 of different diameters to form two control groups. The binary reaction solution was externally marked using dyes. Based on the wavelengths of different color dyes absorbed by the binary reaction solution, the mixed luminescent liquids of the two control groups were output to the corresponding paper, and by measuring the ink marks of the mixed luminescent liquids in the two control groups on the paper at the initial, middle and final stages of drawing and writing experiment, the mixing characteristics of the binary reaction solutions in the two control groups were evaluated according to the concentration changes of the two dyes in the collected ink marks, and the ratio between the cross-sectional area of the inner diameter of barrel 12 and the sum of the cross-sectional areas of the outer diameters of the multiple glass ampoules in barrel 12 was determined.

Moreover, the method for collecting the concentration changes of the two kinds of dyes in the ink marks includes: first, the externally marked binary reaction solution is prepared, and then a full wavelength UV-Vis spectrophotometer is used to measure the wavelengths of the two kinds of reaction solutions, in order to obtain the absorption peak map. The absorption peak map of the mixed solution is then collected in the same way. By using a gradient mixer on the two reaction solutions, the concentration of the two dyes in the mixed solution is changed from low to high in stages. Based on the absorption peak diagram of the mixed solution, the corresponding ABS absorption values of the two dye concentrations in multiple changing stages are determined. The ABS absorption value is used to determine the concentration standard curve regression equation of the two dyes. Finally, according to the ink drawn from the output device, the ABS value of the absorption peaks of the two dyes is measured using a UV-vis spectrophotometer and the concentrations of the two dyes are calculated using the concentration standard curve regression equation.

In this arrangement, the configuration of the externally marked binary reaction solution includes the configuration of the luminescent liquid and the activation liquid, listed as follow. The configuration of the luminescent liquid is bis oxalate 4.9%, triethyl citrate 95%, red fluorescent dye BASF Rot 305 0.1000%. The configuration of the activation liquid includes hydrogen peroxide 2.9%, triethyl citrate 97%, sodium salicylate 100 ppm, and blue dye bisalkyl ether isoviolanthrone 0.1000%.

Therein, barrel 12 of the output devices of the two control groups have the same size. The control group with the larger diameter of the glass ampoules 34 is the output device with two glass ampoules 34, and the two ampoules 34 are filled with luminescent liquid and activation liquid respectively;

the control group with 4 small diameter glass ampoules 34 is the output device with four glass ampoules 34, two of which are filled with luminescent liquid, and the rest are filled with activation liquid.

Figure 7:
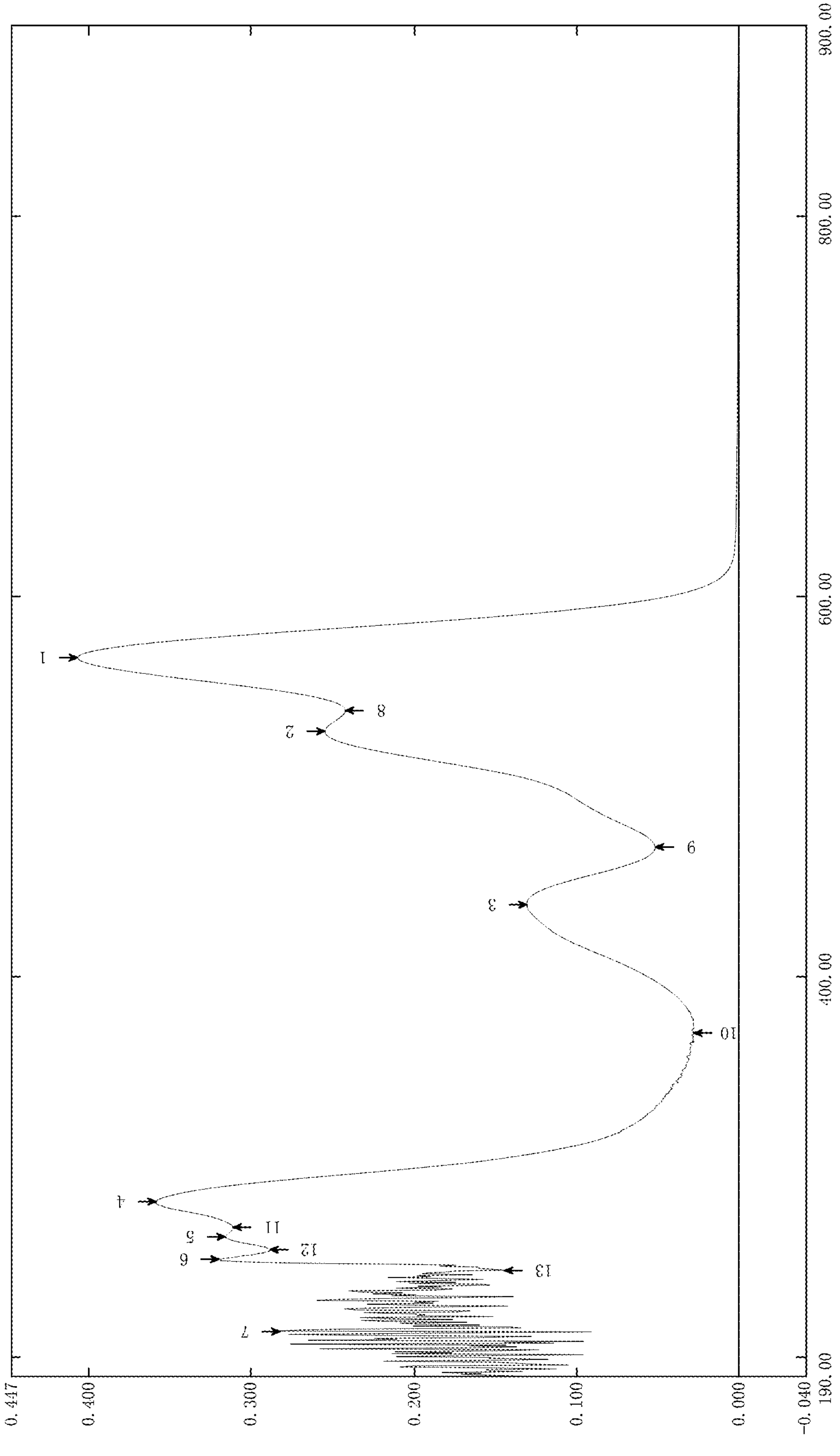
FIG. 7 is an absorption peak diagram of a luminescent liquid according to a preparation method provided by an embodiment of the invention herein.
Figure 8:
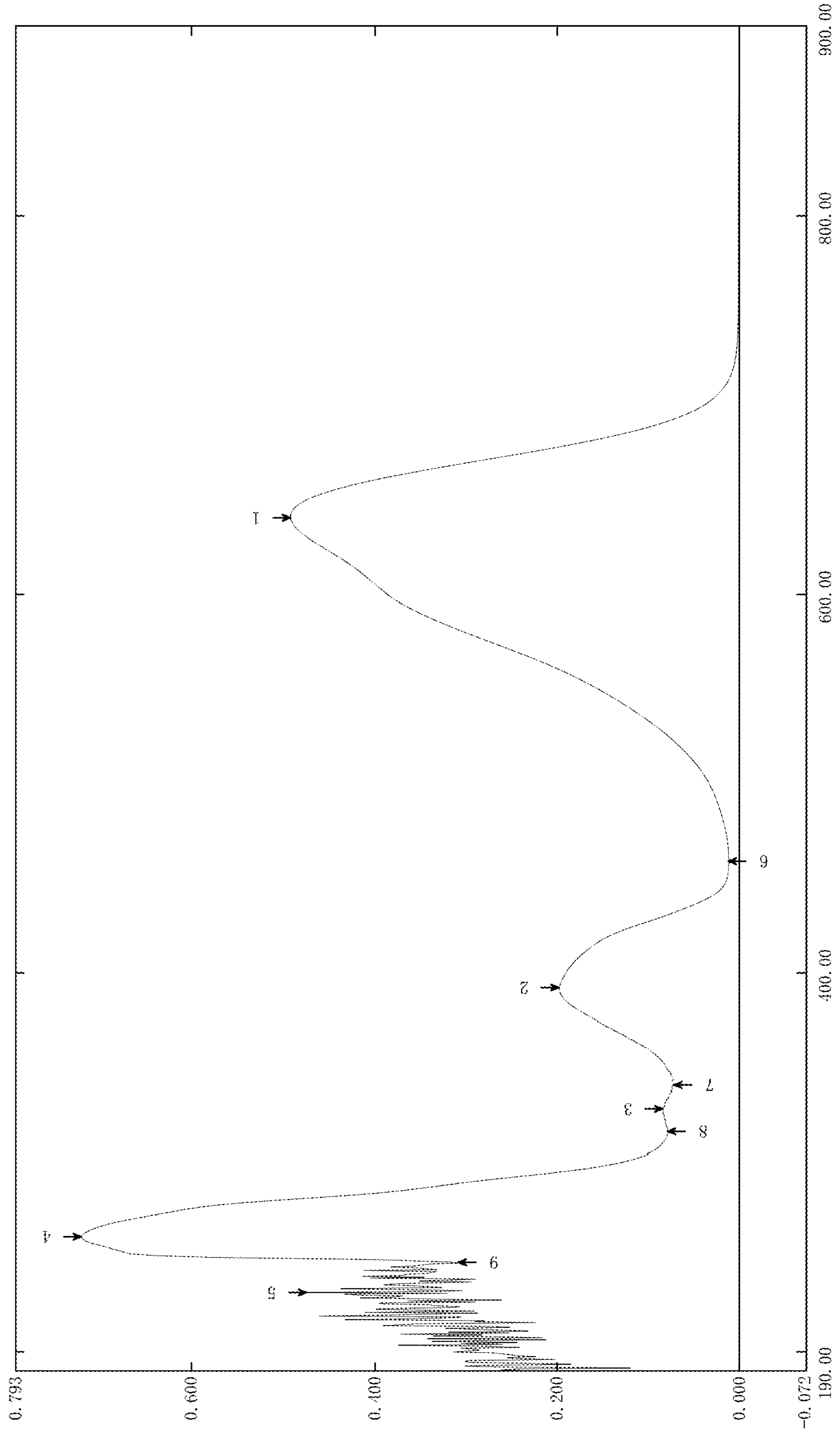
FIG. 8 is an absorption peak diagram of an activation liquid according to a preparation method provided by an embodiment of the invention herein.
Figure 9:
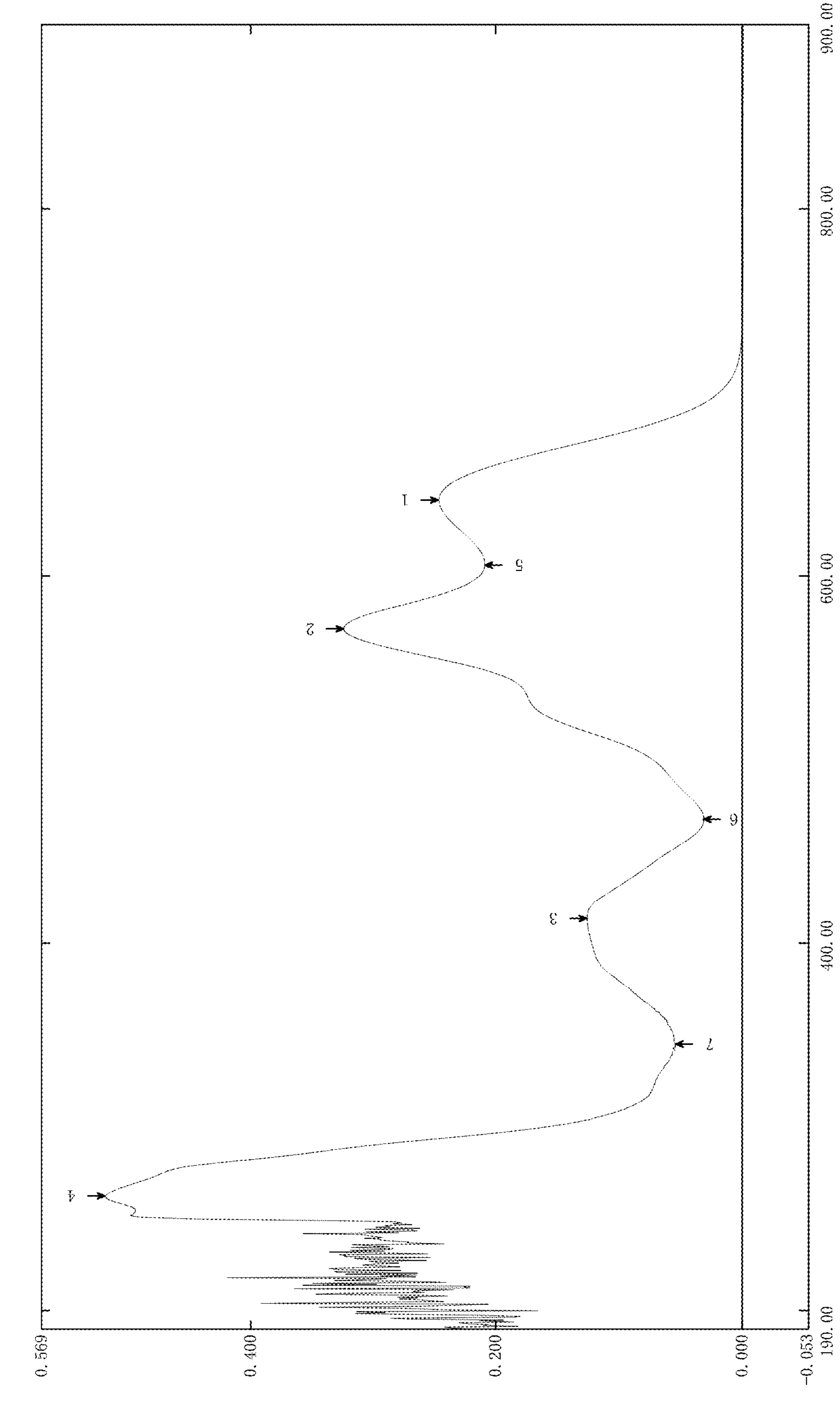
FIG. 9 is an absorption peak diagram of a mixed luminescent liquid according to a preparation method provided by an embodiment of the invention herein.
Figure 10:
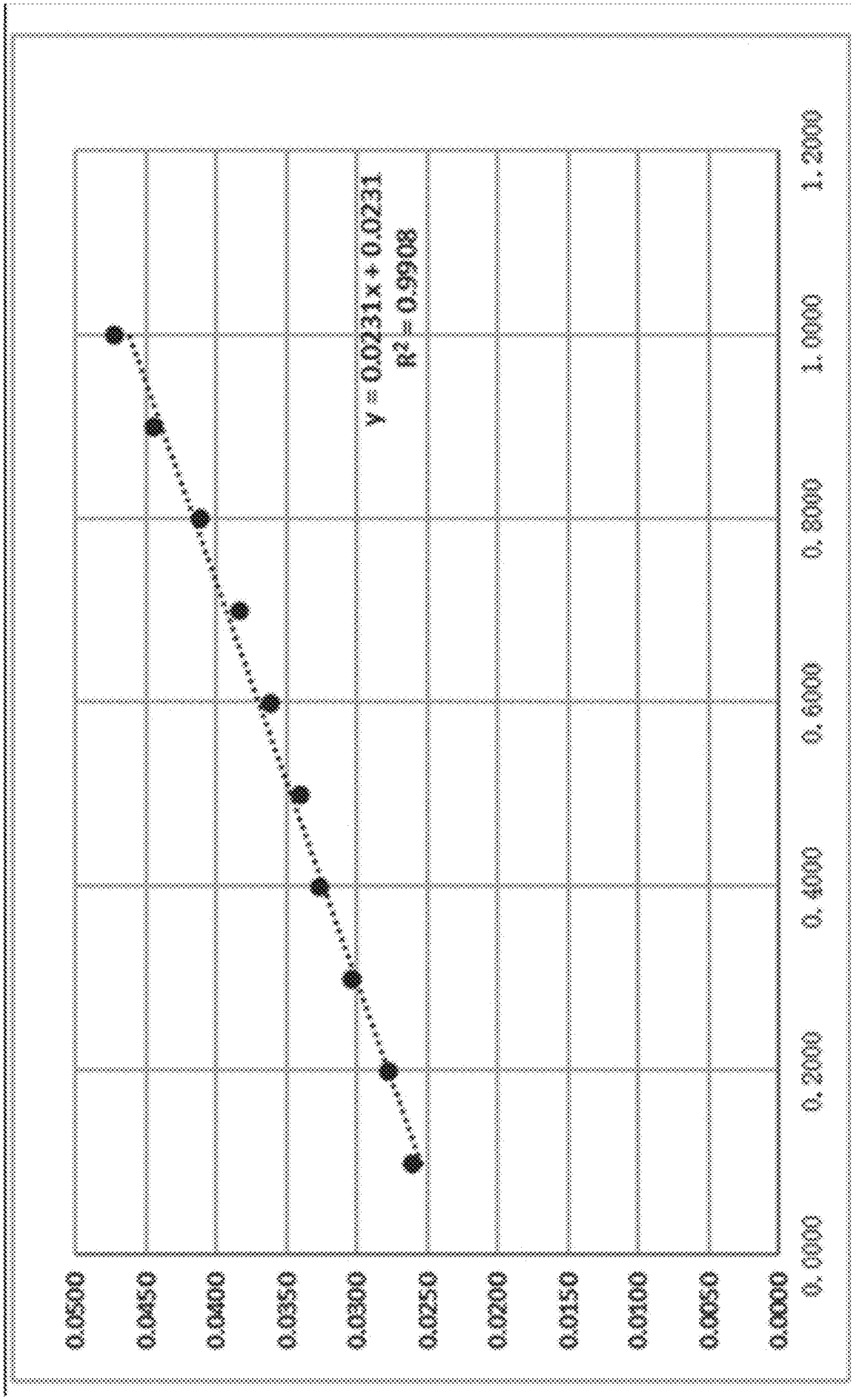
FIG. 10 is a curve diagram of the relation between the concentration of a red dye and the ABS values according to a preparation method provided by an embodiment of the invention herein.
Figure 11:
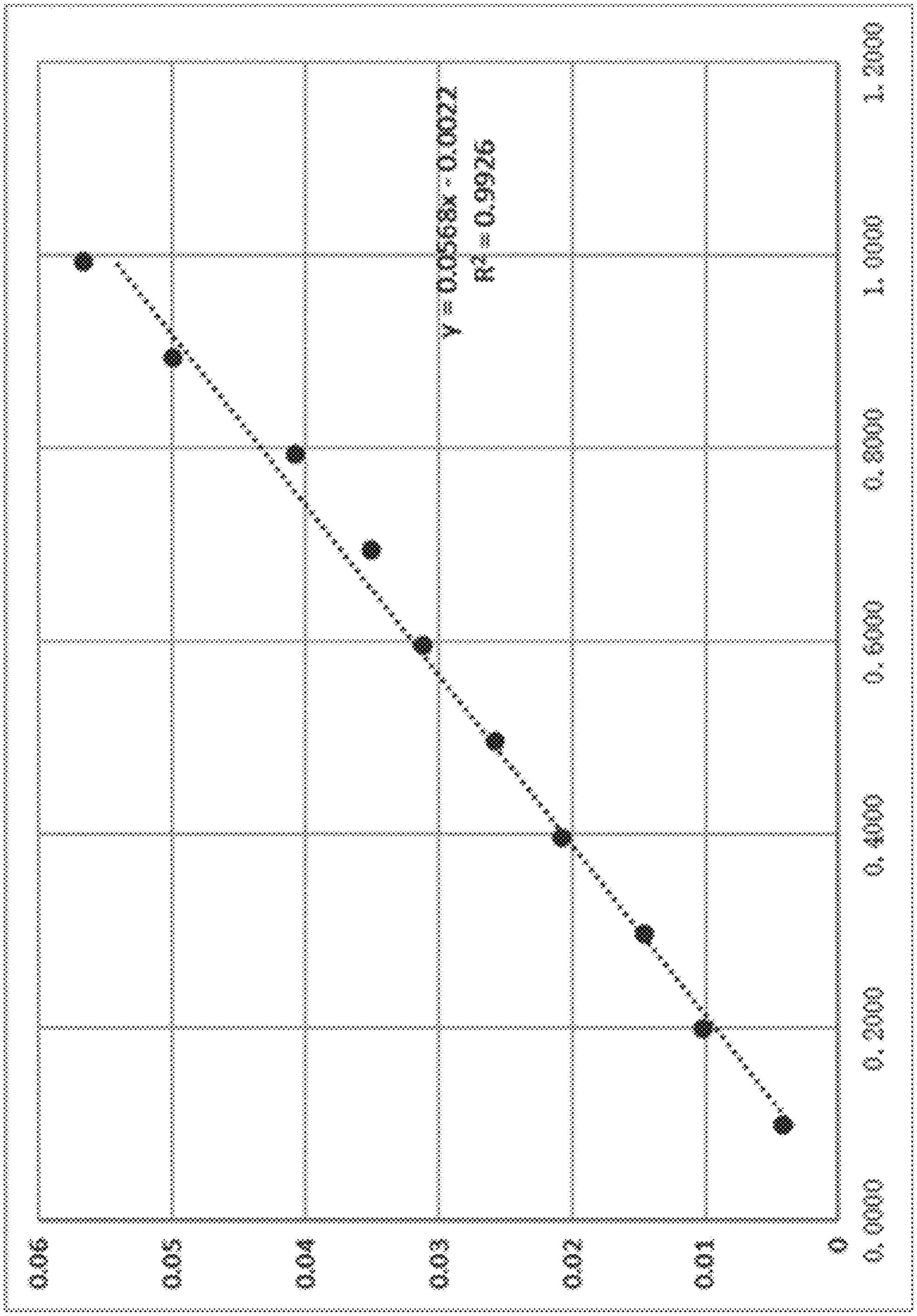
FIG. 11 is a curve diagram of the relation between the concentration of a blue dye and the ABS values according to a preparation method provided by an embodiment of the invention herein.

In order to further illustrate the evaluation method of this embodiment, the following examples are provided:

As shown in FIG. 7, the luminescent liquid was diluted 1000 times using ethyl acetate, the absorption peak map being obtained using a full wavelength UV-Vis spectrophotometer. A typical absorption peak at 568 nm due to red dye can be seen in the visible range. As shown in FIG. 8, the activation liquid was diluted 1000-fold using ethyl acetate, the absorption peak map being obtained using a full wavelength UV-Vis spectrophotometer. A typical absorption peak at 641 nm due to blue dye can be seen in the visible range. As shown in FIG. 9, after mixing the luminescent liquid and the diluent of the activation liquid at a ratio of 1:1, the absorption peak map is obtained using a full wavelength UV-Vis spectrophotometer. Peak #1 is the absorption peak of blue dye at 641 nm; peak #2 is the absorption peak of red dye at 568 nm. As shown in FIG. 10 and FIG. 11, the concentration of the two dyes in the mixed solution is changed from 0.1 ppm to 0.9 ppm by using a gradient mixer on the 1000-fold dilution of the luminescent liquid and the activation liquid, and the corresponding ABS absorption of each concentration is measured. The standard curve regression equation is derived according to the graph.

The output device is constructed according to the structural schematic diagram of barrel 12, nib 22, end plug 14 and glass ampoules 34 shown in FIG. 1, wherein barrel 12 is made of LDPE (high pressure-low density polyethylene) having an inner diameter of 12 mm and a length of 150 mm. The polyethylene material is flexible. Nib 22 is an adsorbent acrylic fiber material with air holes. There are also glass ampoules 34 respectively containing the binary reaction solution.

In this arrangement, a glass ampoule 34 having an outer diameter of 5.8 mm and a length of 100 mm is filled with the luminescent liquid and the activation liquid respectively to 80 mm, and three luminescent pens are made; in addition, three more luminescent pens are made, each using four glass ampoules 34 having dimensions of 4.6 mm in diameter and 100 mm in length. Two of the ampoules are filled with luminescent liquid and the others are filled with activation liquid to 80 mm respectively.

The aforementioned six output devices were horizontally bent in turn to be activated, each of which was shaken vertically 5 times. After nib 22 was soaked in the liquid, the first initial ink mark was drawn about 20 cm long on the #1 quantitative filter paper and then 20 lines were drawn horizontally on a piece of A4 size copy paper. And then a 20 cm-long mid-term ink mark was drawn on the #2 quantitative filter paper, and then 20 lines were drawn horizontally on a new piece of A4 size copy paper. Finally, a 20 cm-long late-term ink mark was drawn on the #3 quantitative filter paper. The filter paper of three ink marks respectively was cut out, and the aforementioned ink marks were soaked and dissolved using an appropriate amount of ethyl acetate (when the measured ABS value exceeds the range of the working curve, a solvent can be appropriately added to dilute or evaporate the solvent to concentrate it) and the ABS value of the corresponding absorption peak is measured at 568 nm and 641 nm, respectively, using a UV-vis spectrophotometer. The corresponding concentration standard curve regression equation is used to calculate the corresponding red and blue dye concentrations in ethyl acetate dilution according to the absorption value (refer to Table 1).

TABLE 1

Concentrations of Different Dyes in Ink Marks Drawn by Output Devices

| | | Luminescent Pen Specifications: Inner Diameter 12 mm; Length 150 mm | | | | | |
|---|---|---|---|---|---|---|---|
| | | 5.8*2 | | | 4.6*4 | | |
| Sample No. | Line | Red Dye Concentration ppm | Blue Dye Concentration ppm | Red:Blue Ratio | Red Dye Concentration ppm | Blue Dye Concentration ppm | Red:Blue Ratio |
| 1 | 1st | 0.002 | 0.561 | 0.00 | 0.374 | 0.380 | 0.98 |
| | 21st | 0.332 | 0.428 | 0.78 | 0.592 | 0.566 | 1.05 |
| | 42nd | 0.463 | 0.393 | 1.18 | 0.102 | 0.089 | 1.15 |
| 2 | 1st | 0.224 | 0.162 | 1.38 | 0.232 | 0.194 | 1.20 |
| | 21st | 0.209 | 0.149 | 1.41 | 0.373 | 0.366 | 1.02 |
| | 42nd | 0.154 | 0.186 | 0.83 | 0.163 | 0.192 | 0.85 |
| 3 | 1st | 0.183 | 0.147 | 1.25 | 0.339 | 0.409 | 0.83 |
| | 21st | 0.206 | 0.236 | 0.87 | 0.421 | 0.361 | 1.17 |
| | 42nd | 0.111 | 0.121 | 0.91 | 0.161 | 0.170 | 0.95 |

As shown in Table 1, the closer the concentration ratio of red and blue dyes in the ethyl acetate diluent is to 1.0, the more uniform the output reaction solution at each stage becomes. In Table 1, the mix output of each pen in three stages can be seen from the ratio of red/blue at each stage close to or far from 1.0: the mix output ratio of the luminescent pen with two 5.8 mm diameter glass ampoules fluctuates relatively violently on both sides of 1.0, indicating that the binary reaction solution is not mixed evenly throughout the use. When the first pen is started, it does not even output any mixed components, but activation liquids. In this case, there will be no luminescence. It is foreseeable that the brightness of the chemiluminescence reaction will vary greatly, and the uniformity of the picture and the light-emitting duration will not be too stable; while the ratio data of the four 4.6 mm glass ampoules of the luminescent pen is basically approximately 1.0, indicating that the mixing effect is good, and light-emission, the desired effect of the formula, is also easier to achieve.

As mentioned above but different from evaluation method A, an evaluation method B is provided below:

The method for determining the specifications of barrel 12 and glass ampoules 34 includes: multiple control groups were formed by equipping output devices with different numbers of glass ampoules 34, and the mixed luminescent liquids of the multiple control groups were output onto the paper to draw corresponding lines. The lengths of the drawing lines in each control group were measured from the starting points to the luminescence positions. According to the lengths of the drawn lines, the mixing characteristics of the binary reaction solutions in the multiple control groups were evaluated, and the ratio between the cross-sectional area of the inner diameter of barrel 12 and the sum of the cross-sectional areas of the outer diameters of multiple glass ampoules 34 in barrel 12 was further determined.

Moreover, multiple control groups comprise:

an output device with two glass ampoules 34, the cross-section of barrel 12 being oval-shaped;

an output device with two glass ampoules 34, the cross-section of barrel 12 being circular;

an output device with more than two glass ampoules 34, the cross-section of barrel 12 being circular;

the inner diameter of barrel 12 is adapted to the number of glass ampoules 34, and the inner diameter of barrel 12 having more glass ampoules 34 is longer than the inner diameter of barrel 12 with fewer glass ampoules 34.

In this embodiment, the binary reaction solution can be configured using a conventional scheme, such as:

Activation liquid: hydrogen peroxide 1.5%; dimethyl phthalate 98.5%; sodium salicylate 100 ppm;

luminescent liquid: bis oxalate 4.8%; butyl benzoate 95%; fluorescent dye 1-C1-BPEA 0.2%.

In order to further illustrate the evaluation method of this embodiment, the following examples are provided:

The output device is constructed according to the structural schematic diagram of barrel 12, nib 22, end plug 14 and glass ampoules 34 shown in FIG. 1. Plastic barrel 12 is horizontally bent twice, so that the glass ampoules 34 inside are broken and vertically shaken 10 times. Timekeeping is done until the liquid completely wets nib 22 and the device is used to repeatedly draw 20 cm long horizontal lines on a piece of white copy paper in the dark. When the drawn lines are seen to be uniform and luminescing normally, the drawing action is stopped. The length from the starting point of the drawn lines to the fully normal brightly luminescence points are measured and recorded. If it is normal mixed output, it will emit light normally from the starting point, which should be recorded as 0 cm. The longer the length is, the worse is the mixing. If the starting point is yellow but does not emit light, it means that the luminescent liquid has not been mixed before being output. If the liquid leaves colorless marks at the starting point and the lines gradually turn yellow, it means that the activation liquid is output without mixing.

Figure 12:
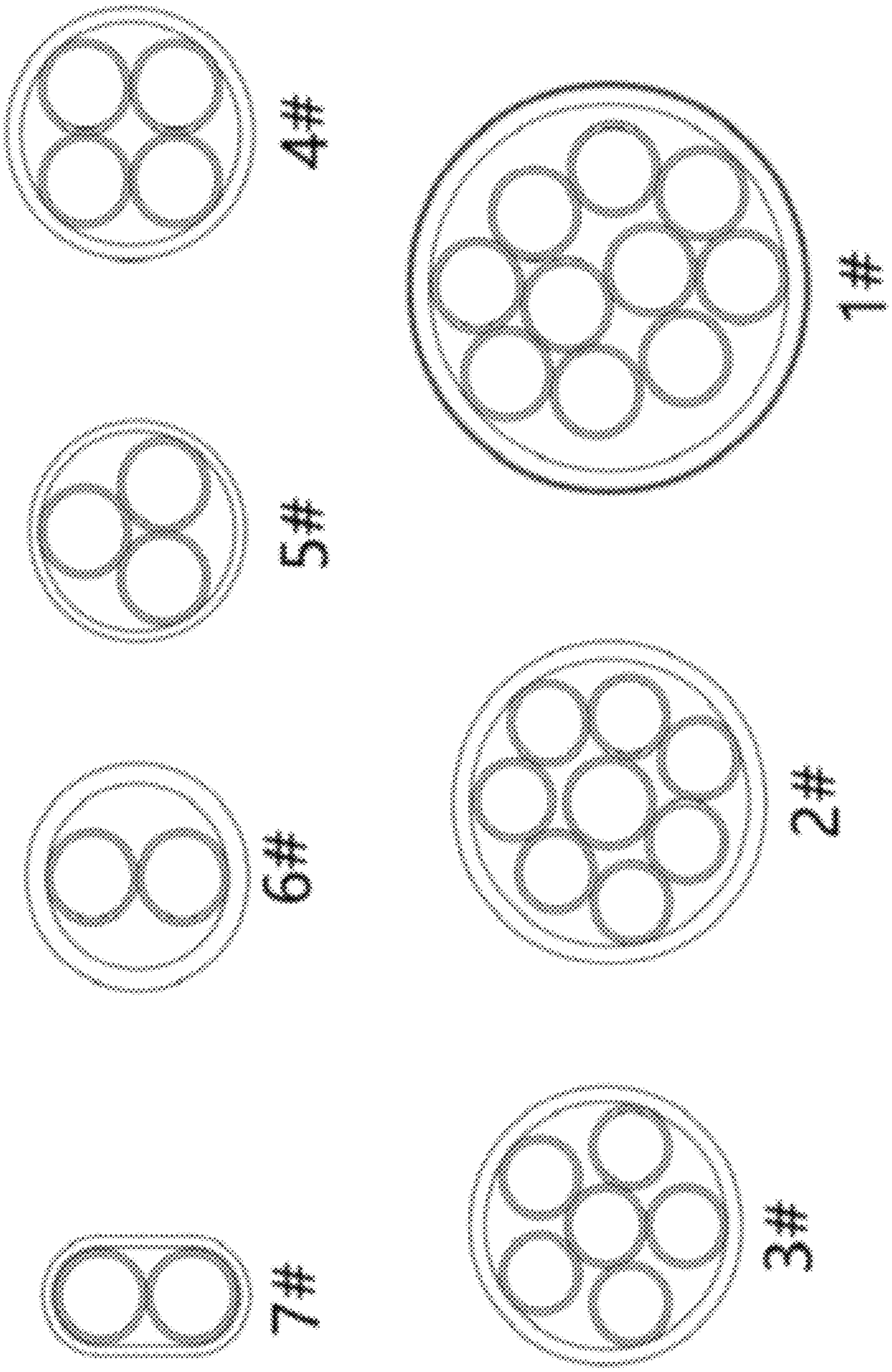
FIG. 12 shows the relationship between barrels and glass ampoules with different cross-sectional area ratios according to a preparation method provided by an embodiment of the invention herein.

As shown in FIG. 12, the inner diameter of barrel 12 of samples No. 1-6 is 11 mm, and the barrel length is 16 cm; barrel 12 of sample No. 7 is an oval with an inner dimension of 13*6 mm. The front end of barrel 12 is transformed into a circular tube shape, which is connected to nib 22. The length of barrel 12 is 16.3 cm; nib 22 is equipped with an 8 mm diameter acrylic fiber tip. The length of the glass ampoules 34 is 70 mm, the level of the liquid therein being 55 mm. Sample No. 5 is two glass ampoules 34 of activation liquid and one of luminescent liquid, both being loaded unevenly. Please refer to Table 2 for the specific experimental parameters.

TABLE 2

Lengths from Starting Points to Luminescence Points of Lines Drawn by Output Devices

| Sample No. | Barrel Shape | Outer Diameter of Glass tube | Number of Glass Tubes | Liquid Volume (mL) | Ratio bw. Cross-sectional Area Inside Tube and glass tube | Number of Samples | Number of Luminescent Pens with normal Starting Point | Total of Distances to Non-luminescent Point (cm) | Average Nib Soaking Time After 50 Samples were Started (s) |
|---|---|---|---|---|---|---|---|---|---|
| 1 | Circular shape | 2.6 | 10 | 2.3 | 1.79 | 50 | 48 | 51 | 202 |
| 2 | Circular shape | 3.0 | 8 | 2.4 | 1.68 | 50 | 47 | 95 | 112 |
| 3 | Circular shape | 3.6 | 6 | 2.6 | 1.56 | 50 | 47 | 128 | 104 |
| 4 | Circular shape | 4.0 | 4 | 2.1 | 1.89 | 50 | 46 | 143 | 63 |
| 5 | Circular shape | 4.6 | 3 | 2.2 | 1.91 | 50 | 21 | 1522 | 33 |
| 6 | Circular shape | 5.2 | 2 | 1.9 | 2.24 | 50 | 32 | 925 | 35 |
| 7 | Oval shape | 5.2 | 2 | 1.9 | 1.65 | 50 | 37 | 553 | 41 |

Table 2 shows that the output devices of samples #1, #2, and #3 loading ten, eight, and six glass ampoules 4 account for at least 94% of the output devices working normally. Four glass ampoules 34 that work normally also account for 92%. Based on the drawing distance of the fifty non-luminescent samples, the samples loading four glass ampoules 34 are almost equivalent to those with eight and six glass ampoules 34, but the average nib soaking time is significantly shorter, only about one minute. As for the output device samples #1, #2, and #3, when glass ampoules 34 are broken, there are many glass fragments, and liquid transportation is greatly obstructed, so the average soaking time required by nib 22 is about 2-3 minutes, leading to a bad user experience.

As for sample #5 with three glass ampoules 34 containing different amounts of liquid, less than 50% of the sample can be mixed and written normally, indicating that the mixing effect is the worst. In the same configuration as for sample #6, the cross-sectional area of the tube is two times and less than three times larger than the cross-sectional area of the glass ampoules 34. Because the number of glass ampoules 34 is lower and the space in the tube is larger, the breaking time is not necessarily synchronized, resulting in quick release and flow of single liquid. The probability of uneven mixing and contact with pen 3 is high, and the qualified mixing percentage is only 64%.

The cross-sectional area of barrel 12 of sample #7 is changed to an oval shape, and the ratio of the inner cross-sectional area of the tube to the cross-sectional area of the glass ampoules 34 is also less than two. However, due to the fact that the two glass ampoules 34 are not shattered simultaneously, the qualified mixing percentage is 74%. However, the soaking time of nib 22 is relatively short, and the average non-luminous distance drawn by each unqualified output pen 3 is 43 cm, so the degree of acceptance by the users is still high.

distances to the non-luminescent points of lines drawn by the 20 output devices on paper was calculated. Also, the luminescence state while stable writing on paper was observed with human eyes were evaluated.

In this evaluation method, the liquid formulation of the second evaluation method as well as the structure of sample #4 are adopted: four glass ampoules 34 having a diameter of 4 mm, two of them being filled with luminescent liquid and two with activation liquid for a total volume of 2.1 mL. Please refer to Table 3 for the specific experimental parameters.

TABLE 3

Output Device Nib Experiment Parameters

| Sample No. | Nib Materials | Number of Samples | Average Nib Soaking Time - 20 Samples (Minutes) | Total of distances to non-luminescent point (cm) | Writing brightness on paper |
|---|---|---|---|---|---|
| A | Acrylic nib | 20 | 1.9 | 31 | Bright |
| B | Fiber nib | 20 | 2.7 | 55 | Weak |
| C | Sintered nib | 20 | 34 | 971 | Very weak |
| D | Felt nib | 20 | 63 | 343 | Very weak |

The above experimental data show that the glass ampoules 34 of the binary reaction solution are arranged in pairs, and the binary liquid charge is equal, which is of great help in effectively improving the uniform output of liquid luminescence pen. The four glass ampoules 34 occupy a moderate amount of space in barrel 12. When bending starts, the four glass ampoules 34 are likely to be broken at the same time. Even if only two glass ampoules are broken, there is a 2/3 chance that effective mixing will occur. In addition, the amount of broken glass fragments is moderate, hence not producing excessive resistance to the liquid output, but forming a good tray effect to promote uniform mixing of the binary reaction solution. In addition, the cost of four glass ampoules is lower than that of six, eight and ten, and assembly and counting are convenient.

As mentioned above but different from evaluation methods A and B, an evaluation method C is explained below:

The method for determining the material of nib 22 includes: multiple control groups were formed by equipping output devices with nibs 2 of different materials. According to the recorded and calculated average time from when the binary reaction solutions of the control groups were mixed until nib 22 became wet, the lengths of the lines drawn with the mixed luminescent liquids from the non-luminescence points to the luminescence positions, and the degree of luminescence of the output devices output onto the paper, the mixing characteristics of binary reaction solutions in multiple control groups were evaluated, and the optimal material scheme for nib 22 was determined.

In order to further illustrate the evaluation method of this embodiment, the following examples are provided:

Nibs 2 with four materials (acrylic, fiber, sintered, and felt) of which the cross-sectional area is 50 $mm^2$; the diameter or the cross-section side length is 7-8 mm; and the length is 20 mm were used to test the effect of the mixed release of the binary reaction solution.

The four kinds of nib 22 above were assembled into the output devices. Twenty output devices were assembled for each kind of nib 22. The average soaking time from the activation of the output devices of each kind of nib 22 after bending started was recorded and calculated, and the total of Table 3 shows that the acrylic nib 22 needs the shortest ink discharge time to achieve uniform mixing and generates the least non-uniform output. It is the best material choice for the medium of chemiluminescent liquid output. The absorption and conduction speed of the luminous liquid by the sinter nib and the felt nib is too slow, and the output of the liquid is too small. Therefore, they are not suitable as nib 22 material for the output device.

As mentioned above but different from evaluation methods A, B, and C, an evaluation method D is explained below:

The method for determining the viscosity of the mixed liquid includes: multiple luminescent liquids of different viscosities and multiple activation liquids of different viscosities were respectively prepared and grouped in pairs into multiple output devices containing luminescent liquids and activation liquids to form multiple control groups. The binary reaction solution was externally marked using dyes as stated in evaluation method A. Based on the wavelengths of different color dyes absorbed by the binary reaction solution, the mixed luminescent liquids of the multiple control groups were output to the corresponding paper, and the concentrations of two dyes of the ink marks left by the mixed luminescent liquids in each control group were measured, and the ideal central value was set. According to the concentration ratio of the two dyes in the control groups, the discrete state of the mixing state and the ideal central value of the luminescent liquids and the activation liquids in the control groups were obtained by formula calculation. The mixing characteristics of the binary reaction solution in multiple control groups were evaluated, and therefrom the optimal viscosity range of the binary reaction solution was determined.

In order to further illustrate the evaluation method of this embodiment, the following examples are provided:

Based on the ratio of luminescent liquid to activation liquid in evaluation method A:

the configuration of the luminescent liquid is bis oxalate 4.9%, triethyl citrate 95%, red fluorescent dye BASF Rot 305 0.1000%; the configuration of the activated liquid includes hydrogen peroxide 2.9%, trimethyl citrate 97%, sodium salicylate 100 ppm, and blue dye bisalkyl ether isoviolanthrone 0.1000%.

The average molecular mass 2900 oxygen-polyoxy acrylonitine polymer L64 is used as thickening agent and mixed with triethyl citrate to adjust the medium-high viscosity of the base agent. Ethyl benzoate is used as the base agent of the low viscosity agent.

The aforementioned solvent was used to prepare luminescent liquids of different viscosities. The prepared liquids were measured with rotors #0 and #1 of LC-NDJ-5T rotor viscometer within the specified speed range at 25 degrees Celsius. The measured viscosity is shown in Table 4:

TABLE 4

| Viscosity of Luminescent Liquids in Different Control Groups | | | | | | |
|---|---|---|---|---|---|---|
| Luminescent Liquid A of Different Viscosities | Low-viscosity Luminescent Liquid A-0 | Medium-viscosity Luminescent Liquid A-1 | Medium-viscosity Luminescent Liquid A-2 | Higher-viscosity Luminescent Liquid A-3 | Higher-viscosity Luminescent Liquid A-4 | High-viscosity Luminescent Liquid A-5 |
| Triethyl citrate | | 95% | 70% | 43% | 30% | 17% |
| Ethyl benzoate | 95% | | | | | |
| L64 | | | 25% | 52% | 65% | 78% |
| Bis oxalate | 4.9% | 4.9% | 4.9% | 4.9% | 4.9% | 4.9% |
| BASF Rot 305 | 0.1% | 0.1% | 0.1% | 0.1% | 0.1% | 0.1% |
| Viscosity at 25 degrees Celsius mp · s (cp) | 2.2 | 35.2 | 80.3 | 180.9 | 253.5 | 330.3 |

The aforementioned solvent was used to prepare activation liquids B of different viscosities. The prepared liquids were measured with rotors #0 and #1 of LC-NDJ-5T rotor viscometer at 25 degrees Celsius. The measured viscosity is shown in Table 5:

TABLE 5

| Viscosity of Activation Liquids in Different Control Groups | | | | | | |
|---|---|---|---|---|---|---|
| Activation Liquid B of Different Viscosities | Low-viscosity Activation Liquid B-0 | Medium-viscosity Activation Liquid B-1 | Medium-viscosity Activation Liquid B-2 | Higher-viscosity Activation Liquid B-3 | Higher-viscosity Activation Liquid B-4 | High-viscosity Activation Liquid B-5 |
| Triethyl citrate | | 97% | 67% | 37% | 25% | 15% |
| Ethyl benzoate | 97% | | | | | |
| L64 | | | 30% | 60% | 72% | 82% |
| Hydrogen peroxide | 2.9% | 2.9% | 2.9% | 2.9% | 2.9% | 2.9% |
| Bisalkyl ether isoviolanthrone | 0.1% | 0.1% | 0.1% | 0.1% | 0.1% | 0.1% |
| Viscosity at 25 degrees Celsius mp · s (cp) | 1.5 | 22.8 | 70.5 | 176.1 | 235.2 | 304.3 |

Glass ampoules having diameter of 4.6 mm and length of 100 mm are filled with luminescent liquid marked A0, A1, A2, A3, A4, A5 for 500 pieces of each kind, and activation liquid marked B0, B1, B2, B3, B4, B5 for 500 pieces of each kind. The fluid level is 80 mm.

The output device is constructed according to the structural schematic diagram of barrel 12, nib 22, end plug 14 and glass ampoule 34 shown in FIG. 1, wherein barrel 12 is made of low-pressure polyethylene having an inner diameter of 12 mm and a length of 150 mm. The polyethylene material is flexible. Nib 22 is an adsorbent acrylic fiber material with air holes. There are also glass ampoules 34 respectively containing the binary reaction solution and end plug 14. Each output device is equipped with two glass ampoules 34 filled with luminescent liquid and two glass ampoules 34 filled with activation liquid.

Arranged in orthogonal order, luminescent liquid A0, A1, A2, A3, A4, A5; activation liquid B0, B1, B2, B3, B4, B5, outputs with thirty-six kinds of viscosity are assembled in the combination of two each glass ampoules 34. Each combination produces five output devices, a total of 180 output devices. The aforementioned output devices are bent to start, each of them being shaken vertically five times. After nib 22 is soaked in the liquid, the first initial ink mark is drawn about 20 cm long on the #1 quantitative filter paper. Evaluation method A is used to measure the concentration of red dye (Ca) and blue dyes (Cb) in ethyl acetate diluent, and the ratio K of Ca/Cb or Cb/Ca is calculated. Theoretically, when ratio K is closer to 1, it means that the mixing effect of the luminescent liquid/activating liquid is closer to ideal uniform mixing.

However, since the above is research on the mixed system of the luminescent liquid and the activation liquid, the central value continues to be 1. If ratio K is equal in two cases when Ca/Cb>1 or Cb/Ca>1, it means that the description of the mixing effect is equivalent, so the geometric standard deviation formula is applied:

$$\sigma_g = \exp\left(\sqrt{\frac{\sum_{i=1}^{g}\left(\ln\frac{A_i}{\mu_g}\right)^2}{n}}\right)$$

In the above formula, $A_i$ refers to the Ca and Cb calculated after five pens in each group are started to mix and write (Ca/Cb=K), which are K1, K2, K3, K4, K5 respectively;

Central value 1 as the expected value replaces the geometric mean μg in the above formula, n=5;

The operation result of σg means the discrete state of the mixed state of the luminescent liquid/activating liquid and the ideal central value of 1. We note the result as p, which means the deviation from the ideal state of uniform mixing. The more the value p deviates from 1, the less uniformly the pen is mixed in the initial stage. In other words, the closer it is to 1, the better the mixing is. The value p is calculated based on the data from the 36 groups and is recorded in the following orthogonal table of the mixing relationship of different viscosities of luminescent liquids/activation liquids (refer to Table 6). The value p of each group is compared in Table 6. (Note: Since this test only examines the distribution of dyes in the first stroke after the nib is wet, sometimes serious uneven mixing occurs, resulting in the concentration of red (Ca) and blue dyes (Cb) in the stroke being undetectable. When this happens, new samples of the formula will be prepared for retesting.)

TABLE 6

| Value p of 36 Control Groups | | | | | | |
|---|---|---|---|---|---|---|
| Value p | A-0 | A-1 | A-2 | A-3 | A-4 | A-5 |
| B-0 | 1.10 | 1.14 | 1.20 | 1.49 | 3.48 | 5.35 |
| B-1 | 1.14 | 1.07 | 1.07 | 1.20 | 1.35 | 3.96 |
| B-2 | 1.18 | 1.16 | 1.02 | 1.05 | 1.31 | 1.40 |
| B-3 | 1.68 | 1.09 | 1.03 | 1.01 | 1.25 | 1.92 |
| B-4 | 2.54 | 1.22 | 1.11 | 1.06 | 1.08 | 1.26 |
| B-5 | 4.46 | 2.23 | 1.71 | 1.53 | 1.51 | 1.33 |

It can be seen from the data in the above table that when A-0 and B-5, B-4 or B-0 and A-4, A-5 are combined with luminescent liquids/activation liquids having large viscosity differences, the data is more likely to deviates from 1. At the same time, serious uneven mixing event occurred many times in the test, resulting in the K value equals 0, meaning that the mixing effect was poor. Combinations such as A2 and B2, A3 and B3, A4 and A4, which the viscosities were similar, showed the best mixing effect. However, the paired mixture of luminescent liquid/activation liquid with different viscosities between 20-250 mpa·s has a certain latitude. The value p is mostly within 1.3, and the mixing effect is acceptable. Especially for the mixture of luminescent liquid/activation liquid with viscosity between 70-180 mpa·s, the p value is basically within 1.2. The mixing effect of luminescent liquid/activation liquid compatible with different viscosities is very close to that of those having the same viscosity, which is also good. When coloring, it can also be observed that when the luminescent liquid and the activation liquid are low-viscosity of a viscosity less than 5 cp at the same time, the liquid layer formed on the paper surface after mixing is thinner, and the color is lighter so the effect is poor. However, when the luminescent liquid and the activation liquid are of a high-viscosity of a viscosity greater than 300 cp at the same time, the individual differences in the mixing effect are large, the speed of the wetting of the nib is relatively slow, and the user experience is poor.

In other word, when the viscosity of luminescent liquid and activation liquid is consistent or close (both having a viscosity of 0.6-1.6), the mixing effect is best;

When the viscosity of the luminescent liquid is selected between 35-253.5 cpp, the mixing effect is also good in any combination with the viscosity of the activation liquid between 20-235 cpp;

When the viscosity of the luminescent liquid is selected between 80-180 cpp, the mixing effect is the best in any combination with the viscosity of the activation liquid between 70-176 cpp;

Based on the above evaluation methods, the invention herein conducted a drawing and writing experiment on the variable factors of the specifications of barrel 12 and the glass ampoules 34, the material of nib 22, and the viscosity of the mixed liquid using the mixture of binary reaction liquids based on single-variable factors. It evaluated and selected the optimal solution for the uniform output of the mixed luminescent liquid under a single-variable factor based on the luminescence parameters between the control groups. It also determined the optimal combination scheme of the specifications of barrel 12 and glass ampoules 34, the material of nib 22, and the viscosity of the mixed liquid according to the optimal solution selected under multiple single-variable factors, which therefore resulted in a reliable, simple and low-cost output device for solving the problem of not allowing the liquid to be uniformly mixed and output when the chemiluminescent pen was activated.

Selected Combinations of Elements

An output device A for uniformly mixed liquid is characterized as the aforementioned device comprising:

A barrel—The barrel is a hollow cylindrical structure made of a flexible material, which includes an open head end and a closed end;

A nib—The nib is embedded in the head of the barrel, and the tip of the nib extends from the head of barrel;

A binary ink storage assembly with two or more glass ampoules—The binary reaction solution is stored separately in multiple glass ampoules, placed in the barrel in parallel; therein, the ratio between the cross-sectional area of the inner diameter of the barrel and the sum of the cross-sectional areas of the outer diameters of the multiple glass ampoules in the barrel is less than 3:1.

The output device A may be characterized in that the multiple glass ampoules in the binary ink storage assembly are arranged in pairs. The lengths and diameters of the multiple glass ampoules are equal to each other. The number of glass ampoules ranges from 2 to 8. The barrel is adapted to the glass ampoules, and the barrel is a cylindrical structure having an inner diameter ranging from 3 to 15 mm.

The output device A may be characterized in that the multiple glass ampoules correspond to the same volume of reaction solution; the length of the glass ampoule is 60%-90% of the length of the inner surface of the barrel; the ratio of the length to the diameter of the glass ampoule is more than 10:1; the diameter of the glass ampoule ranges from 1.8 mm-5.2 mm.

The output device A may be characterized in that the barrel is a cylindrical structure made of polyethylene.

The output device A may be characterized in that the nib is a bullet-head structure made of acrylic fiber material.

An output device B may comprise output device A further characterized in that a spacing ring is fixed inside the barrel and behind the nib. The spacing ring is a cylindrical structure with a vent hole so as to form an exhaust gap between the nib and the barrel. An output device C may comprise output device B further characterized in that a circular base is inside the barrel and behind the spacing ring, and it fixedly connects to the rear end of the spacing ring. The circular base and the rear end of the spacing ring form a gap for the liquid to flow into the vent hole of the spacing ring from the inside of the barrel. Therein, a gap for the liquid to flow is formed between the exterior wall of the circular base and the interior wall of the barrel.

Output devices B and/or C may be even further characterized in that the spacing ring is used as a vent insert, and its material is optimally ABS plastic. The spacing ring is a hollow cylindrical structure with open ends and has a front end facing the head of the barrel and a rear end facing the end of the barrel. The nib is embedded in the opening of the front end of the spacing ring. Its exterior wall is seamlessly assembled to the interior wall of the barrel, and the exterior side wall of the front end of the spacing ring has the first vent hole connecting the inner space of the spacing ring. The exterior side wall of the front end of the spacing ring has the first slot on the opposite side of the first vent hole. The exterior wall of the spacing ring has the first vent channel connecting the first vent hole and the first slot; therein, the first vent channel extends along the circumferential direction with the first vent hole as a starting point and turns vertically at a point close to its own intersection towards the rear end of the spacing ring and extends circumferentially in the opposite direction, forming a spiral labyrinth structure extending spirally from the front end to the rear end of the spacing ring. After the first vent channel extends to the rear end of the spacing ring, it turns vertically at a point close to its own intersection at the rear end and extends straight to the front end of the first vent channel, connecting to the first slot.

The output device C further characterized in that a notch is formed at the front end of the spacing ring at the first slot.

An output device D comprises output device A further characterized in that the end of the barrel is an open structure, and an end plug is sealed at the end of the barrel. Output device D further characterized in that an exhaust gap is formed between the end plug and the barrel, and an exhaust filter structure is arranged on the end plug to guide the air flow to the exhaust gap. Output device E comprising output device D further characterized in that the end plug is an inner hollow cylindrical structure, which has an open end toward the end of the barrel and a closed end away from the end of the barrel. The second vent hole is arranged on the open end surface of the end plug and connects to the inner space of the end plug. The second slot is arranged on the exterior side wall of the closed end of the end plug and corresponds with the second vent hole. The second vent channel is arranged on the exterior wall of the end plug to connect the second vent hole and the second slot; wherein, the second vent channel extends along the circumferential direction with the second vent hole as a starting point and turns vertically at a point close to its own intersection towards the closed end of the end plug and extends circumferentially in the opposite direction, forming a spiral labyrinth structure extending spirally from the closed end to the closed end of the end plug. After the second vent channel extends to the closed end of the end plug, it turns vertically at a point close to its own intersection at the closed end and extends straight to the closed end of the end plug, connecting to the second slot.

Output device F comprising output device E further characterized in that the end plug is comprised of a plug-in tube post and a circular end cap that is integrally formed from the open end to the closed end. The diameter of the plug-in tube post is smaller than the inner diameter of the end of the barrel, and the diameter of the circular end cap is longer than or equal to the outer diameter of the end of the barrel, wherein the second slot extends onto the circular end cap.

A preparation method G is used for preparing the output devices A-F mentioned in above, including:

- the preparation of a plurality of output devices with different structural combinations in accordance with variable factors, including the specifications of the barrel and the glass ampoules, the material of the nib, and the viscosity of the mixed liquid;
- obtaining multiple control groups based on the same variable factor by summarizing and grouping multiple output devices that conform to a single variable factor;
- combining multiple control groups under the same variable factor for drawing and writing experiments, collecting luminescence parameters of the mixed luminescent liquid output in the multiple control groups, and evaluating and selecting the optimal solution for the uniform output of the mixed luminescent liquid under a single-variable factor based on the luminescence parameters between the control groups;
- determining the optimal combination scheme of the specifications of the barrel and the glass ampoules, the material of the nib, and the mixed liquid viscosity according to the optimal solution selected under multiple single-variable factors.

A preparation method H comprising preparation method G further characterized in that the method for determining the specifications of the barrel and the glass ampoules includes: the method of dye calibration was used to equip output devices with glass ampoules of different diameters to form two control groups. The binary reaction solution was externally marked using dyes. Based on the wavelengths of different color dyes absorbed by the binary reaction solution, the mixed luminescent liquids of the two control groups were output to the corresponding paper, and by measuring the ink marks of the mixed luminescent liquids in the two control groups on the paper at the initial, middle and final stages of drawing and writing experiment, the mixing characteristics of the binary reaction solutions in the two control groups were evaluated according to the concentration changes of the two dyes in the collected ink marks, and the ratio between the cross-sectional area of the inner diameter of the barrel and the sum of the cross-sectional areas of the outer diameters of the multiple glass ampoules in the barrel was determined.

Preparation method I comprising preparation method H further characterized in that the barrels of the output devices of the two control groups have the same size. The control group with the larger glass ampoule diameter is the output device with two glass ampoules, which are filled with luminescent liquid and activation liquid respectively. The control group having a small glass ampoule diameter is an output device with four glass ampoules, two of which are filled with luminescent liquid, and the rest are filled with activation liquid.

Preparation method J comprising preparation method G further characterized in that the method for determining the specifications of the barrel and the glass ampoules includes: multiple control groups were formed by equipping output devices with different numbers of glass ampoules, and the mixed luminescent liquids of the multiple control groups were output onto the paper to draw corresponding lines. The lengths of the drawing lines in each control group were measured from the starting points to the luminescence positions. According to the lengths of the drawn lines, the mixing characteristics of the binary reaction solutions in the multiple control groups were evaluated, and the ratio between the cross-sectional area of the inner diameter of the barrel and the sum of the cross-sectional areas of the outer diameters of the multiple glass ampoules in the barrel was determined.

The preparation method J further characterized in that the multiple control groups comprise:

- an output device with two glass ampoules, the cross-section of the barrel being oval-shaped;
- an output device with two glass ampoules, the cross-section of the barrel being circular;
- an output device with more than two glass ampoules, the cross-section of the barrel being circular;
- therein, the inner diameter of the barrel is adapted to the number of glass ampoules, and the inner diameter of the barrel with more glass ampoules is longer than the inner diameter of the barrel with fewer glass ampoules.

The preparation method G further characterized in that the method for determining the material of the nib includes: multiple control groups were formed by equipping output devices with nibs of different materials. According to the recorded and calculated average time from when the binary reaction solutions of the control groups were mixed until the nib became wet, the lengths of the lines drawn with the mixed luminescent liquids from the non-luminescence points to the luminescence positions, and the degree of luminescence of the output devices output onto the paper, the mixing characteristics of binary reaction solutions in multiple control groups were evaluated, and the optimal material scheme for the nib was determined.

Preparation method K comprising preparation method G further characterized in that the method for determining the viscosity of the mixed liquid includes: multiple luminescent liquids of different viscosities and multiple activation liquids of different viscosities were respectively prepared and grouped in pairs into multiple output devices containing luminescent liquids and activation liquids to form multiple control groups. The binary reaction solution was externally marked using dyes. Based on the wavelengths of different color dyes absorbed by the binary reaction solution, the mixed luminescent liquids of the multiple control groups were output to the corresponding paper, and the concentrations of two dyes of the ink marks left by the mixed luminescent liquids in each control group were measured, and the ideal central value was set. According to the concentration ratio of the two dyes in the control groups, the discrete state of the mixing state and the ideal central value of the luminescent liquids and the activation liquids in the control groups were obtained by formula calculation. The mixing characteristics of the binary reaction solution in multiple control groups were evaluated, and therefrom the optimal viscosity range of the binary reaction solution was determined.

The preparation method K further characterized in that, by determining the mix liquid viscosity, the viscosity range for the best mixing effect is confirmed, that is the viscosity ratio between the luminescent liquid and the activation liquid starts at 0.6-1.6, with any combination where the viscosity of both liquids is consistent or close.

The preparation method K further characterized in that, by determining the mix liquid viscosity, the viscosity range of the best mixing effect is confirmed, that is any combination of the luminescent liquid viscosity ranging from 35-253.5 cpp and the activation liquid viscosity ranging from 20-235 cpp.

The preparation method K characterized in that, by determining the mix liquid viscosity, the viscosity range of the best mixing effect is confirmed, that is any combination of the luminescent liquid viscosity ranging from 80-180 cpp and the activation liquid viscosity ranging from 70-176 cpp.

Finally, it should be noted that the above embodiments are only used to illustrate the technical solutions of the invention herein, but not to limit them; although the invention herein has been described in detail with reference to the foregoing embodiments, those skilled in the art should understand that they may still modify the technical solutions recorded in each of the foregoing embodiments, or equivalently replace some of the technical features therein; and these modifications or replacements do not make the essence of the corresponding technical solutions deviate from the spirit and scope of the technical solutions of the embodiments of the invention herein.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A vented output device for uniformly mixed liquid comprising:

- a barrel having an open head end and a closed end, an interior of the barrel defining a reservoir for containing liquid;
- a vent insert positioned with the open head end of the barrel, an interior of the vent insert in fluid flow communication with the reservoir and defining a chamber for containing liquid;
- a nib positioned within a front open end of the vent insert and in fluid flow communication with the chamber, wherein a tip of the nib extends outward from the barrel;
- at least one vent channel extending from a first vent opening in fluid flow communication with an exterior of the device and second vent opening in fluid flow communication with the chamber;
- wherein the vent insert is hollow extending from the open front end to a rear end defined by a circular base, wherein the circular base is slightly smaller in diameter than the barrel such that gaps are formed between the walls of the barrel and the base.

2. The vented output device of claim 1, wherein the base is set off a distance from a main body of the vent insert and wherein the main body and base are coupled to each other via legs.

3. The vented output device of claim 2, wherein an outer surface of the main body is in tight abutting contact with an interior surface of barrel, and wherein the vent channel comprises an elongated closed channel extending from the first vent opening to the second vent opening between an outer surface of the main body and an interior surface of the barrel.

4. The vented output device of claim 3, wherein the vent channel is defined by grooves inset within the outer surface of the main body and by the interior surface of barrel.

5. The vented output device of claim 4, wherein the vent channel has a square shaped cross-section.

6. The vented output device of claim 3, wherein the vent channel extends in a helical pattern around a portion of a circumference of the main body.

7. The vented output device of claim 2, wherein the legs extend rearward from the main body at spaced intervals around a perimeter of the main body to define gaps interspaced between the legs.

8. The vented output device of claim 1, wherein the vent channel comprises an elongated closed channel extending from the first vent opening to the second vent opening between an outer surface of the vent insert and an interior surface of the barrel.

9. The vented output device of claim 8, wherein the vent channel is defined by grooves inset within the outer surface of the vent insert and by the interior surface of the barrel.

10. The vented output device of claim 1, wherein the device additionally comprises an end plug with an end plug vent channel at the closed end of the barrel, the end plug vent channel extending from a first plug opening in fluid flow communication with the reservoir and a second plug opening in fluid flow communication with an exterior of the output device.

11. The vented output device of claim 10, wherein the end plug comprises a tubular post that is sized and shaped to be snugly received within the interior of the barrel and a rear circular end cap on an exterior of the barrel, the tubular post having an open forward end in fluid flow communication with the reservoir.

12. The vented output device of claim 11, wherein the end plug vent channel is an elongated closed channel extending from the first plug opening to the second plug opening between an outer surface of the tubular post and the interior surface of barrel.

13. The vented output device of claim 12, wherein the second plug opening is defined by a slot in the end cap.

14. The vented output device of claim 12, wherein the end plug vent channel is formed by grooves inset within an outer surface of the tubular post and by an interior surface of the barrel.

15. The output device of claim 1, wherein the output device comprises two or more glass ampoules for storing the components of a binary reaction solution separately in the glass ampoules, the two or more glass ampoules positioned within the barrel in parallel, wherein the ratio between the cross-sectional area of an inner diameter of the barrel and the sum of the cross-sectional areas of the outer diameters of the two or more glass ampoules in the barrel is less than 3:1.

16. The output device of claim 15, wherein the two or more glass ampoules are arranged in pairs, and the lengths and diameters of the multiple glass ampoules are equal to each other.

17. The output device of claim 15, wherein the number of glass ampoules ranges from 2 to 8, and the barrel is a cylindrical structure having an inner diameter ranging from 3 to 15 mm.

18. The output device of claim 15, wherein:

each of the glass ampoules correspond to the same volume of reaction solution;

the length of each glass ampoule is 60%-90% of the length of an inner surface of the barrel;

the ratio of the length to the diameter of each glass ampoule is more than 10:1; and the diameter of each glass ampoule ranges from 1.8 mm-5.2 mm.

19. The output device of claim 15, wherein the barrel is a cylindrical structure made of polyethylene.

20. The output device of claim 19, wherein the nib is a bullet-head structure made of acrylic fiber material.

21. A vented output device for uniformly mixed liquid comprising:

a barrel having an open head end and a closed end, an interior of the barrel defining a reservoir for containing liquid;

a vent insert positioned with the open head end of the barrel, an interior of the vent insert in fluid flow communication with the reservoir and defining a chamber for containing liquid;

a nib positioned within a front open end of the vent insert and in fluid flow communication with the chamber, wherein a tip of the nib extends outward from the barrel;

at least one vent channel extending from a first vent opening in fluid flow communication with an exterior of the device and a second vent opening in fluid flow communication with the chamber;

wherein the vent insert is hollow extending from the open front end to a rear end defined by a circular base, wherein the circular base is slightly smaller in diameter than the barrel such that gaps are formed between the walls of the barrel and the base, and wherein an outer surface of a main body of the vent insert is in tight abutting contact with an interior surface of the barrel, and wherein the vent channel comprises an elongated closed channel extending from the first vent opening to the second vent opening between an outer surface of the main body and an interior surface of the barrel.

22. The vented output device of claim 21, wherein the base is set off a distance from a main body of the vent insert and wherein the main body and base are coupled to each other via legs.

23. The vented output device of claim 22, wherein the legs extend rearward from the main body at spaced intervals around a perimeter of the main body to define gaps interspaced between the legs.

* * * * *